(12) United States Patent
Sano et al.

(10) Patent No.: US 6,381,251 B1
(45) Date of Patent: Apr. 30, 2002

(54) DATA TRANSMISSION APPARATUS AND RECEIVING APPARATUS USING ORTHOGONAL FREQUENCY DIVISION MULTIPLEX MODULATION SYSTEM

(75) Inventors: Seiichi Sano, Higashiyamato; Toshiyuki Akiyama; Atsushi Miyashita, both of Tokorozawa; Nobuo Tsukamoto, Akishima, all of (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/096,454

(22) Filed: Jun. 11, 1998

(30) Foreign Application Priority Data

Jun. 12, 1997 (JP) ............................................. 9-155591

(51) Int. Cl.$^7$ .............................. H04J 1/00; H04J 3/06; H04J 11/00
(52) U.S. Cl. ....................... 370/480; 370/509; 370/210; 375/136; 375/149; 375/354
(58) Field of Search ................................ 370/203, 206, 370/208, 210, 335, 342, 503, 507, 509, 510, 512, 513, 514, 516, 517, 520; 375/354–355, 356, 360, 364, 365, 366, 368, 371, 130, 136, 137, 140, 142, 143, 147, 149, 150

(56) References Cited

U.S. PATENT DOCUMENTS 5,063,574 A 11/1991 Moose
5,166,924 A 11/1992 Moose (List continued on next page.)

FOREIGN PATENT DOCUMENTS

EP 0788264 * 6/1997 ........... H04L/27/28
JP 7030513 1/1995
JP 7321762 12/1995
WO 9205646 4/1992
WO 9210043 6/1992

OTHER PUBLICATIONS

S. Moriyama, et al., "A Study on Field Pickup Unit using OFDM Modulation Scheme", Technical Report vol. 19, No. 38 of the Institute of Television Engineers of Japan, Aug. 1995, pp. 7–12.

*Primary Examiner*—Wellington Chin
*Assistant Examiner*—Steven Nguyen
(74) *Attorney, Agent, or Firm*—Antonelli, Terry, Stout & Kraus, LLP

(57) ABSTRACT

A data transmission apparatus of an orthogonal frequency multiplex modulation system wherein data is transmitted using a plurality of carriers which are in a mutually orthogonal relationship with one another. The apparatus includes a transmitter which previously inserts a group of predetermined synchronization symbols into an OFDM modulated transmission signal every fixed period and a receiver which demodulates a received OFDM modulated transmission signal to a baseband OFDM signal. In the receiver, an absolute value of an A/D converted digital signal is taken and the signal is bandwidth-limited to a predetermined band width. Then, it is decided whether an amplitude of the signal is larger than or smaller than a predetermined value and a decision result thereof is produced. A null section in the synchronization symbol group is detected on the basis of the decision result and a start point of another synchronization symbol subsequent to the null section is further detected. The time when both of the presence of the null section and the start point of another synchronization symbol are detected is regarded as a synchronization timing and the operation timing of a demodulator for the receiver is set to the synchronization timing.

42 Claims, 16 Drawing Sheets

U.S. PATENT DOCUMENTS

| | | | | |
|---|---|---|---|---|
| 5,471,464 A | * | 11/1995 | Ikeda | 370/203 |
| 5,596,582 A | * | 1/1997 | Sato et al. | 370/509 |
| 5,608,764 A | * | 3/1997 | Sugita et al. | 375/344 |
| 5,694,389 A | | 12/1997 | Seki et al. | 370/208 |
| 5,732,068 A | | 3/1998 | Takahashi et al. | |
| 5,761,190 A | * | 6/1998 | Yamauchi et al. | 370/210 |
| 5,771,224 A | | 6/1998 | Seki et al. | |
| 5,774,450 A | * | 6/1998 | Harada et al. | 370/206 |
| 5,790,516 A | | 8/1998 | Gudmundson et al. | |
| 5,822,323 A | | 10/1998 | Kaneko et al. | |
| 5,953,311 A | | 9/1999 | Davies et al. | |
| 6,005,894 A | | 12/1999 | Kumar | |
| 6,038,275 A | * | 3/2000 | Taura et al. | 375/371 |
| 6,058,101 A | * | 5/2000 | Huang et al. | 370/208 |
| 6,115,427 A | | 9/2000 | Calderbank et al. | 375/267 |
| 6,304,611 B1 | | 10/2001 | Miyashita et al. | |

* cited by examiner

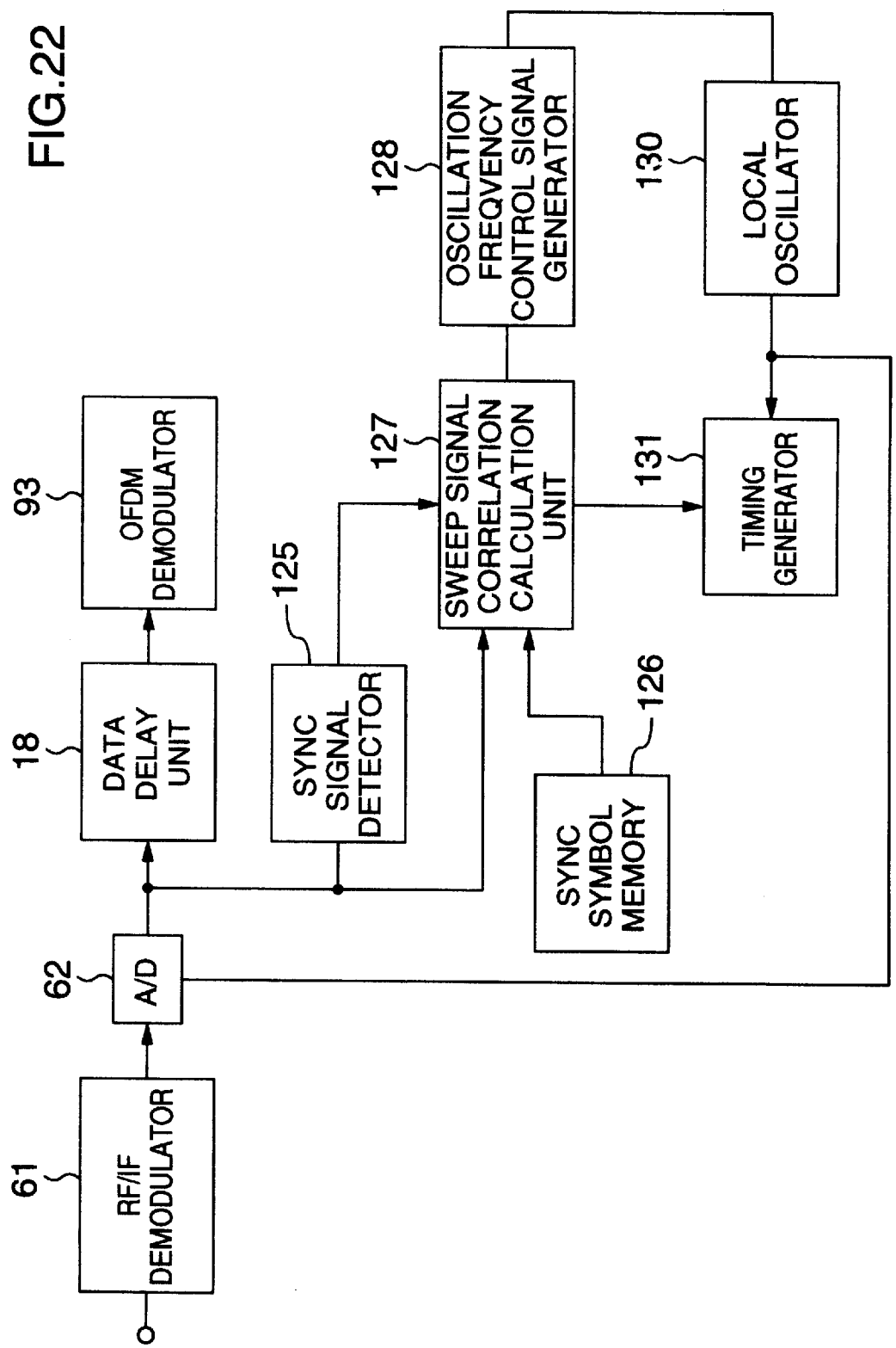

DATA TRANSMISSION APPARATUS AND RECEIVING APPARATUS USING ORTHOGONAL FREQUENCY DIVISION MULTIPLEX MODULATION SYSTEM

CROSS-REFERENCES TO RELATED APPLICATIONS

U.S. Pat. application Ser. No. 09/099,390 filed on Jun. 18, 1998 in the names of Atsushi Miyashita et al., entitled IIOFDM MODULATOR AND OFDM MODULATION METHOD FOR DIGITAL MODULATED WAVE HAVING GUARD INTERNAL", now U.S. Pat. No. 6,304,611, and claiming priority based on Japanese Patent Application No. 9-162579 filed on Jun. 19, 1997 and assigned to the assignee of the present invention is related to the present invention and the disclosure thereof is hereby incorporated by reference. Further, U.S. patent application Ser. No. 09/098,346, filed on Jun. 17, 1998 in the name of Toshiyuki Akiyama et al., entitled "TRANSMITTING AND RECEIVING METHOD OF ORTHOGONAL FREQUENCY DIVISION MULTIPLEXED MODULATION -SIGNAL AND COMMUNICATION SYSTEM", now abandoned, and claiming priority based on Japanese Patent Application No. 9-161486 filed on Jun. 18, 1997 and assigned to the assignee of the present invention is also related to the present invention and the disclosure thereof is hereby incorporated by reference.

BACKGROUND OF THE INVENTION

The present invention relates to a transmission apparatus for transmitting information by means of an Orthogonal Frequency Division Multiplex (OFDM) system and more particularly to the technique for improving the accuracy of detection of synchronization of a demodulator in a receiver.

In the OFDM system, a multiplicity of carriers having phases orthogonal to one another and having a narrow frequency band width are arranged in a given frequency band for communication. When a signal modulated by the OFDM system and transmitted is to be demodulated by a receiver, it is necessary to pick up synchronization information from the OFDM signal which, before attaining synchronization, looks like noise and then demodulate the signal.

As measures for taking synchronization between a receiver and transmitter, an example is described in JP-A-7-030513, in which no signal sections (null sections) are previously inserted into the OFDM signal periodically in the transmitter so that the null sections are used as a reference to take synchronization.

Further, another example is described in "A Study on Field Pickup Unit Using OFDM Modulation Scheme" by Shigeki et al, Institute of Television Engineers of Japan, Technical Report vol., 19, No. 38, pp. 7–12, August 1995, in which a group of synchronization symbols including a null section, a sweep signal (which varies from a lower limit frequency to an upper limit frequency of a transmission band during one symbol) and the like is inserted in the beginning of a frame which is a unit for data transmission processing and synchronization is taken using the synchronization symbol group.

The configuration of a demodulator used in the above example is shown in FIG. 2.

In this demodulator, an RF signal modulated by the OFDM system is converted into an IF frequency by a receiving unit RF 90 and then converted into a baseband by a receiving unit IF 91. The converted signal is digitized by an A/D converter 62 and is supplied to an OFDM demodulator 93. In synchronization detection, an output signal of the receiving unit RF 90 is subjected to a square-law detection and synchronization detection in a synchronization detector 92 and an output signal of the synchronization detector 92 is supplied to the OFDM demodulator 93.

JP-A-7-321762 discloses a technique in which sample values of the same synchronization symbol waveform (sweep signal) as that in a transmitter are stored in a receiver and correlation values of the sample values of the synchronization symbol waveform and sample values of a received signal are calculated in a correlation calculator, so that a clock frequency in the receiver is controlled to be coincident with a clock frequency of the received signal.

SUMMARY OF THE INVENTION

First, the prior art requires a high-frequency analog circuit for effecting the square-law detection and the synchronization detection with respect to the output signal of the receiving unit RF 90 of FIG. 2 which is an analog high-frequency signal and it is not easy to realize a stable synchronization detection circuit providing for mixing of noise. Second, when noise is mixed in the null section or multipath and fading occur in the section in which data is transmitted resulting in a reduced reception level even if the synchronization detection is digitally processed, there occurs the problem that the data transmission section is mistaken as the no signal section and finally the synchronization detection cannot be detected stably.

Waveforms of signals at portions of FIG. 2 are now described with reference to FIGS. 3A and 3B.

The output of the receiving unit RF 90 of FIG. 2 has a certain amplitude during transmission of data as shown by an OFDM received signal 71 of FIG. 3A and the null sections of N1, N2 and N3 are provided periodically.

Accordingly, the OFDM demodulator 93 detects the null sections at points N1 and N2 of the OFDM received signal 71 of FIG. 3A to produce synchronization detection signals 72 (S1 and S2) as shown in FIG. 3B. However, when a level is reduced due to influence of the multipath and the fading as shown by a section F1 of the OFDM received signal 71, a signal S3 is produced in error.

Further, as shown by the null section N3 of the OFDM received signal 71, when noises are mixed in this null section, the null section cannot be sometimes detected as shown by the synchronization detection signal 72.

Accordingly, it is an object of the present invention to provide an orthogonal frequency division multiplex data transmission apparatus capable of effecting detection of synchronization stably.

According to an aspect of the present invention, in order to achieve the above object, a transmitter of the data transmission apparatus using the orthogonal frequency division multiplex modulation system previously inserts a group of predetermined synchronization symbols into a transmission signal every fixed period in order to synchronize a receiver with the transmitter and the receiver demodulates a received transmission signal to a baseband OFDM signal. An absolute value of an A/D converted digital signal is taken and an obtained absolute signal is bandwidth-limited to a predetermined band width. Then, it is decided whether an amplitude of the signal is larger than or smaller than a predetermined value. A no signal period (hereinafter referred to as a null section) in the synchronization symbol group is detected on the basis of the decision result and a start point of another synchronization symbol subsequent to the null section is further detected. The time when both of the presence of the null section and the start point of the different synchronization symbol are detected is regarded as a synchronization timing and the operation timing of a demodulator for the receiver is set to the synchronization timing.

Further, the comparison and decision processing as to whether the amplitude of the signal converted into the absolute value and bandwidth-limited to the predetermined band width is larger than or smaller than the predetermined value is performed by using a comparator for making comparison as to whether the amplitude of the signal is larger than or smaller than the predetermined value and a counter for increasing or decreasing a count thereof in accordance with the comparison result and in the detection and decision processing of the null section, the point of time when the count is larger than or smaller than the predetermined value is detected as the start point of the null section.

Moreover, the detection of the start point of the another synchronization symbol subsequent to the null section is performed by using a majority decision type edge detector for deciding whether the start point is reached or not from signal states of N samples (N is an integer larger than or equal to 2) obtained from the comparison decision result.

In addition, the majority decision type edge detection means includes means for counting the number of times a signal of the another synchronization symbol which is produced subsequent to the null section exceeds a predetermined threshold value during a period of N samples and detecting a position of the start point of the another synchronization symbol on the basis of a count thereof and means for judging whether an arrangement of signal values of the another synchronization symbol during the period of N samples is a predetermined arrangement or not to detect the start point of the different synchronization symbol.

As has been described above, in the present invention, in order to detect the null section, the level of the digitized baseband OFDM signal is used to decide the null section to thereby digitize the detection processing of the null section, so that the operation is stabilized. Further, the level of the sweep signal subsequent to the null section is examined, so that the detection is hard to be influenced by noise even if noise is instantaneously mixed into the null section.

Further, even when multipath or fading occurs to thereby reduce the level of the received signal, the null section is confirmed by the above method and accordingly the probability of mistaking the null section can be reduced.

Furthermore, in the present invention, in order to synchronize the receiver with the transmitter, since the detection of the start point of the sweep signal after the null section of the received signal is not decided by only one sample and uses majority decision type edge detection in which decision is made on the basis of signal states of N samples, the start point of the sweep signal can be detected with higher accuracy even if noise is mixed into the null section of the received signal and the sweep signal subsequent to the null section.

BRIEF DESCRIPTION OF THE DRAWINGS

FIG. 22 is a block diagram illustrating a part of an OFDM receiver according to an embodiment of the invention, focusing on detection of the sweep signal from the received signal and synchronization of the receiver with the transmitter.

DETAILED DESCRIPTION OF THE PREFERRED EMBODIMENTS

Figure 10:
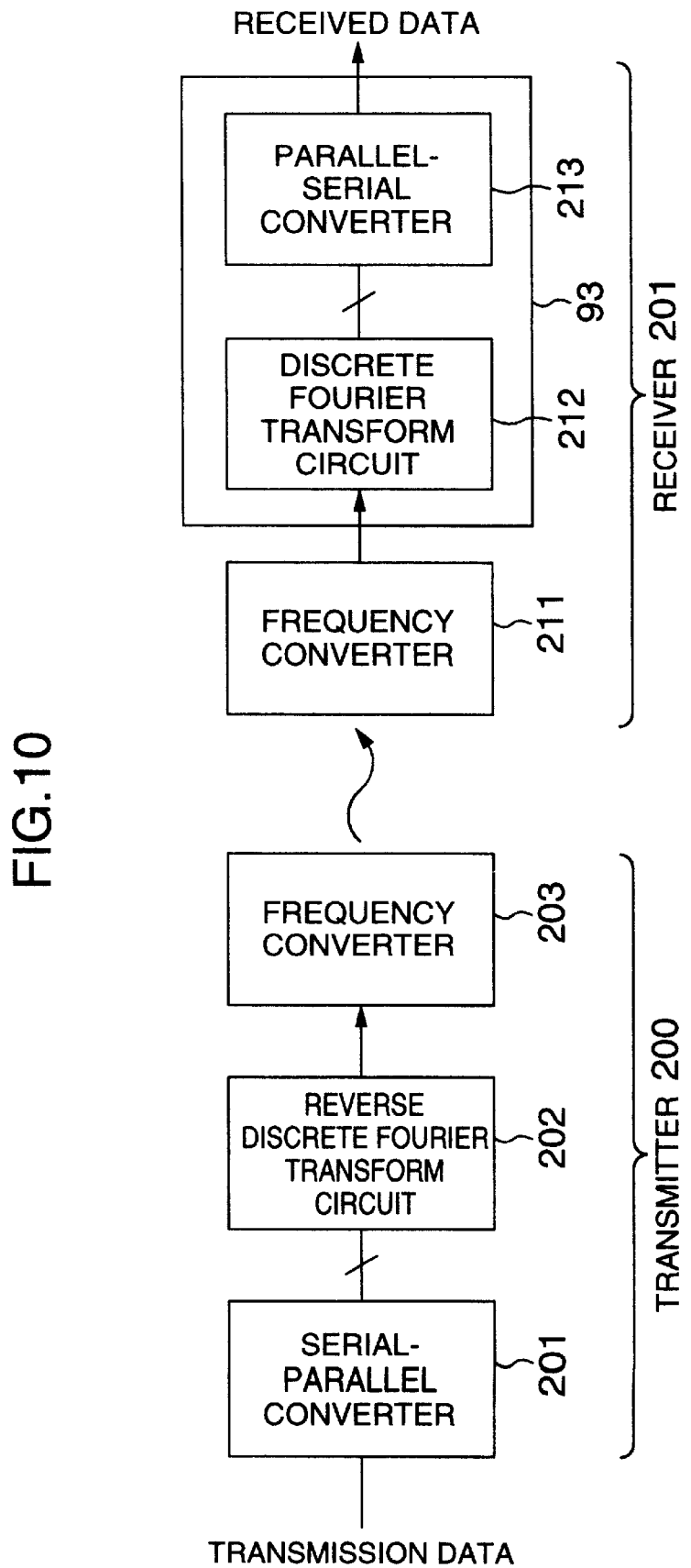
FIG. 10 is a block diagram schematically illustrating a transmission apparatus of an OFDM system to which the present invention is applied.

Referring first to FIG. 10, a transmitter 200 and a receiver 210 of an OFDM system to which the present invention is applied are described. In the transmitter 200, series-arranged transmission data are supplied to a serial-parallel converter 201 to be converted into parallel-arranged transmission data, which are supplied to a reverse discrete Fourier transform circuit 202 to be reverse Fourier transformed. A synchronization signal and the like are added to the reverse Fourier transformed signal in a frequency conversion unit 203, so that the signal is converted into a signal in a frequency band for transmission and is outputted from the transmitter 200.

In the receiver 210, the data of the transmission frequency transmitted from the transmitter 200 is converted into a baseband OFDM signal by a frequency conversion unit 211 to be subjected to processing such as synchronization detection. An output signal of the frequency conversion unit 211 is supplied to an OFDM demodulator 93 and is subjected to the discrete Fourier transform in a discrete Fourier transform circuit 212 in the OFDM demodulator 93 to produce received data.

Figure 15:
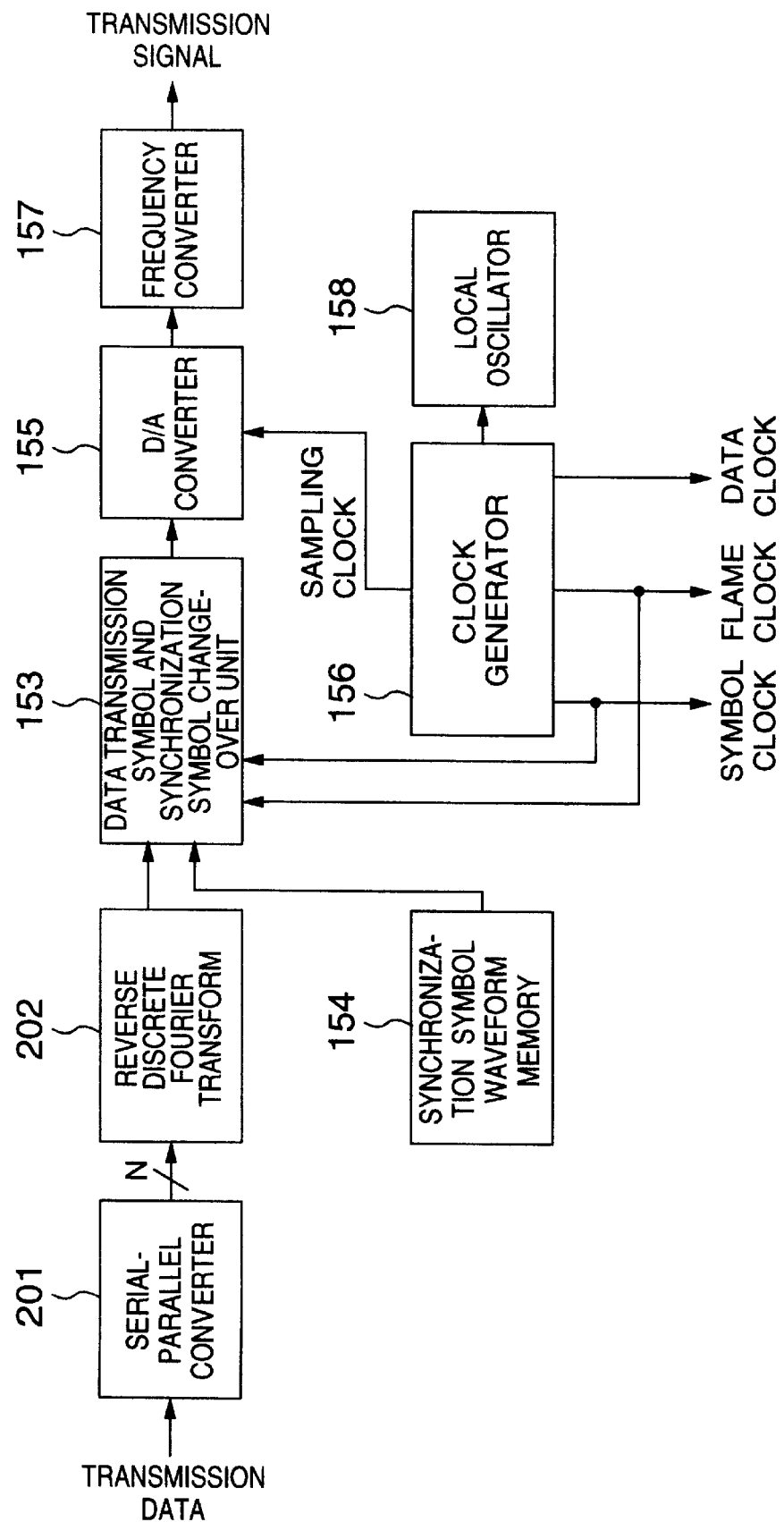
FIG. 15 is a block diagram schematically illustrating a transmission unit of a data transmission apparatus of an embodiment according to the present invention.
Figure 16:
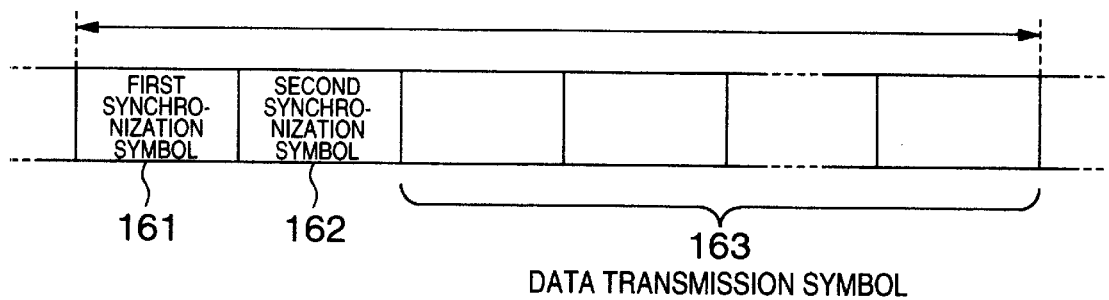
FIG. 16 shows a structure of transmission data.
Figure 17:
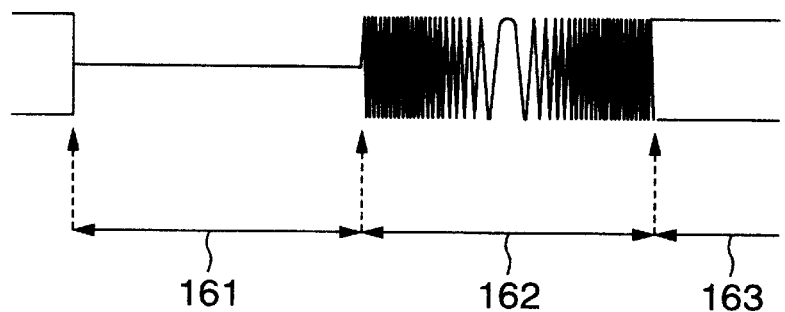
FIG. 17 shows definite examples of first and second synchronization symbols inserted into a transmission signal.

Referring now to FIGS. 15, 16 and 17, a configuration of the transmitter of a data transmission apparatus according to the present invention is described.

FIG. 15 schematically illustrates an internal configuration of the transmitter 200 of FIG. 10 in detail.

In the transmitter 200, the series-arranged transmission data are supplied to the serial-parallel converter 201 to be converted into the parallel-arranged transmission data, which are supplied to the reverse discrete Fourier transform circuit 202 to be reverse Fourier transformed.

A data transmission symbol and synchronization symbol change-over unit 153 selects the transmission signal obtained by the reverse Fourier transform and a synchronization symbol produced by a synchronization symbol waveform memory 154. FIG. 16 shows a format of the transmission signal selected by the change-over unit 153. A frame which is a unit for data transmission includes a first synchronization symbol 161, a second synchronization symbol 162 and a data transmission symbol 163. A particular example of signals of the first and second synchronization symbols 161 and 162 is shown in FIG. 17. The first synchronization symbol 161 is a null signal. The second synchronization symbol 162 is a sweep signal varying from a predetermined maximum frequency to minimum frequency. The signal produced from the change-over unit 153 is converted into an analog signal by a D/A converter 155 and is converted into a predetermined frequency by a frequency conversion unit 157 to produce a transmission signal. A local oscillator 158 and a clock generator 156 produce clocks for operating each block of the transmitter.

The demodulating unit for receiver according to an embodiment of the data transmission apparatus of the present invention is now described with reference to FIGS. 1 and 11. The signal transmitted from the OFDM transmitter is converted into an IF frequency by an RF/IF demodulation unit 61 to be then demodulated so that the baseband OFDM signal 71 is produced.

The baseband OFDM signal 71 is converted into a digital signal by the A/D converter 62. An output signal of the A/D converter 62 is supplied to a controller 10 for demodulator. The signal supplied to the controller 10 is converted into an absolute value signal by an absolute value circuit 9. A waveform of the absolute value signal S10 is an OFDM signal 73 of FIG. 11B.

The signal S10 is supplied to a low pass filter 11 in order to reduce noise contained in the signal and an output signal of the low pass filter 11 is compared with a decision level set by an amplitude-of-received signal decision level setting unit 13 by an amplitude-of-received signal decision unit 12 (for example, general-purpose logic IC 74LS85) to produce a signal S12.

The amplitude-of-received signal decision unit 12 is now described with reference to FIGS. 12 and 13.

Figure 12:
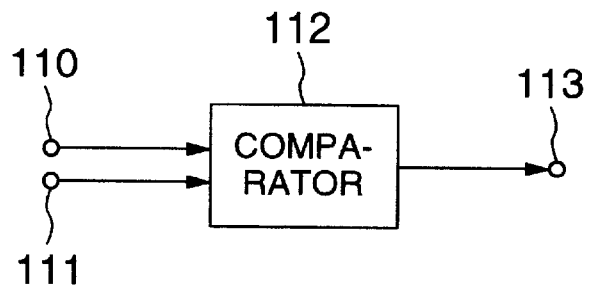
FIG. 12 is a block diagram illustrating an amplitude-of-received signal decision unit.

In FIG. 12, the output signal of the low pass filter 11 is supplied to an input terminal 110 of FIG. 12. Further, in order to decide a magnitude of the input signal, the threshold value set by the amplitude-of-received signal decision level setting unit 13 is supplied to an input terminal 111. The comparator 112 compares the signal supplied to the input terminal 110 with the signal supplied to the input terminal 111 and produces an "H" level signal to a decided result output 113 when the signal of the input terminal 111 is larger than the signal of the input terminal 110. Further, the comparator 112 compares the signal of the input terminal 110 with the signal of the input terminal 111 and produces an "L" level signal to the decided result output 113 when the signal of the input terminal 111 is smaller.

Figure 13:
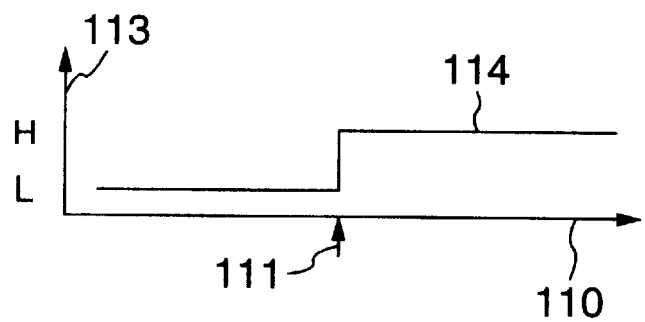
FIG. 13 shows a signal level at a portion of the amplitude-of-received signal decision unit shown in FIG. 12.

FIG. 13 shows a relation of the input terminals 110 and 111 and the decided result output 113. A signal level (received signal) at the input terminal 110 is represented by the abscissa axis and a signal level at the decided result output 113 is represented by the ordinate axis. When a signal level at the input terminal 111 (threshold) is set as shown in FIG. 13, the signal level at the decided result output 113 varies from "H" level to "L" level with respect to the signal level at the input terminal 111 as shown by an output waveform 114.

As has been described above, the signal S12 is low level when the signal S12 is smaller than the set decision level and the signal S12 is high level when the signal S12 is larger than the decision level. A waveform of the signal S12 is as shown by a decided result 74 of FIG. 11C. The signal S12 is supplied to a null section detector 14 constituted by a random walk counter (for example, general-purpose logic IC 74LS191) a value of which is increased when an input thereto is low level and is reduced when the input is high level.

Figure 11A:
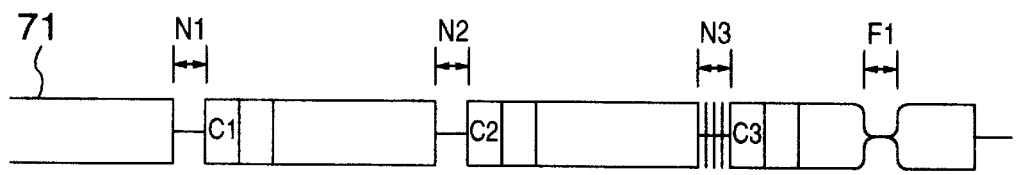
FIGS. 11A to 11G show waveforms of signals at portions of a modulating unit for receiver of a data transmission apparatus according to an embodiment of the present invention.
Figure 11B:
Figure 11C:
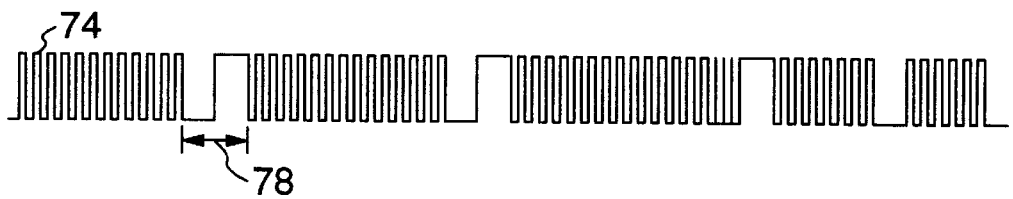
Figure 11D:

The value of the random walk counter in the null section detector 14 is increased and reduced as shown by a count 75 shown in FIG. 11D.

Figure 14:
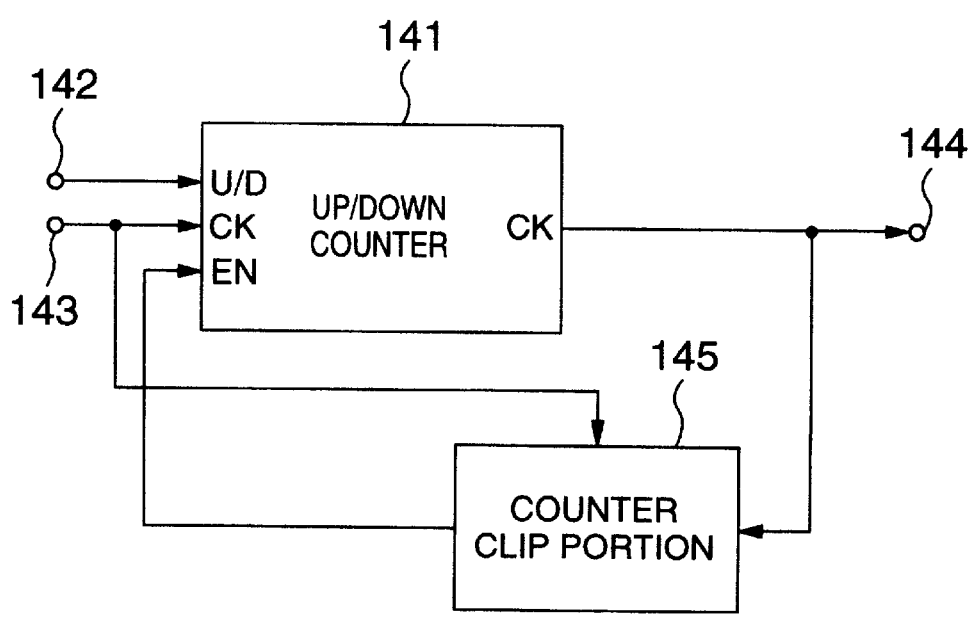
FIG. 14 is a block diagram illustrating a null section detector.

Operation of the random walk counter is now described with reference to FIG. 14. The random walk counter is composed of an up/down counter portion 141 and a counter clip portion 145. A signal inputted to an input terminal 142 is supplied to an up/down selection terminal of the up/down counter 141. A clock for operating the up/down counter 141 is inputted to a clock terminal 143. Whether the signal inputted to the input terminal 142 is "H" or "L" is judged at the timing of the clock inputted to the clock terminal 143. When the signal is "H", the value of the up/down counter 141 is increased and when the signal is "L", the value of the up/down counter 141 is reduced. The counter clip portion 145 is supplied with an output signal 144 of the up/down counter and the input signal inputted to the input terminal 142. When a count of the up/down counter 141 reaches a maximum value, the counter clip portion 145 controls an enable terminal EN of the up/down counter 141 to "L" so that the maximum value is held to prevent the up/down counter 141 from continuing the count-up operation and from returning to a minimum value. Further, when a count of the up/down counter 141 reaches a minimum value, the counter clip portion 145 controls the enable terminal EN of the up/down counter 141 to "L" so that the minimum value is held to prevent the up/down counter 141 from continuing the count-down operation and from returning to the maximum value.

Figure 11E:

When the count of the random walk counter exceeds a previously set prescribed value, the null section detector 14 judges that the section considered to be null is detected and produces a null section detection signal as shown by a waveform 76 of FIG. 11E.

Figure 1:
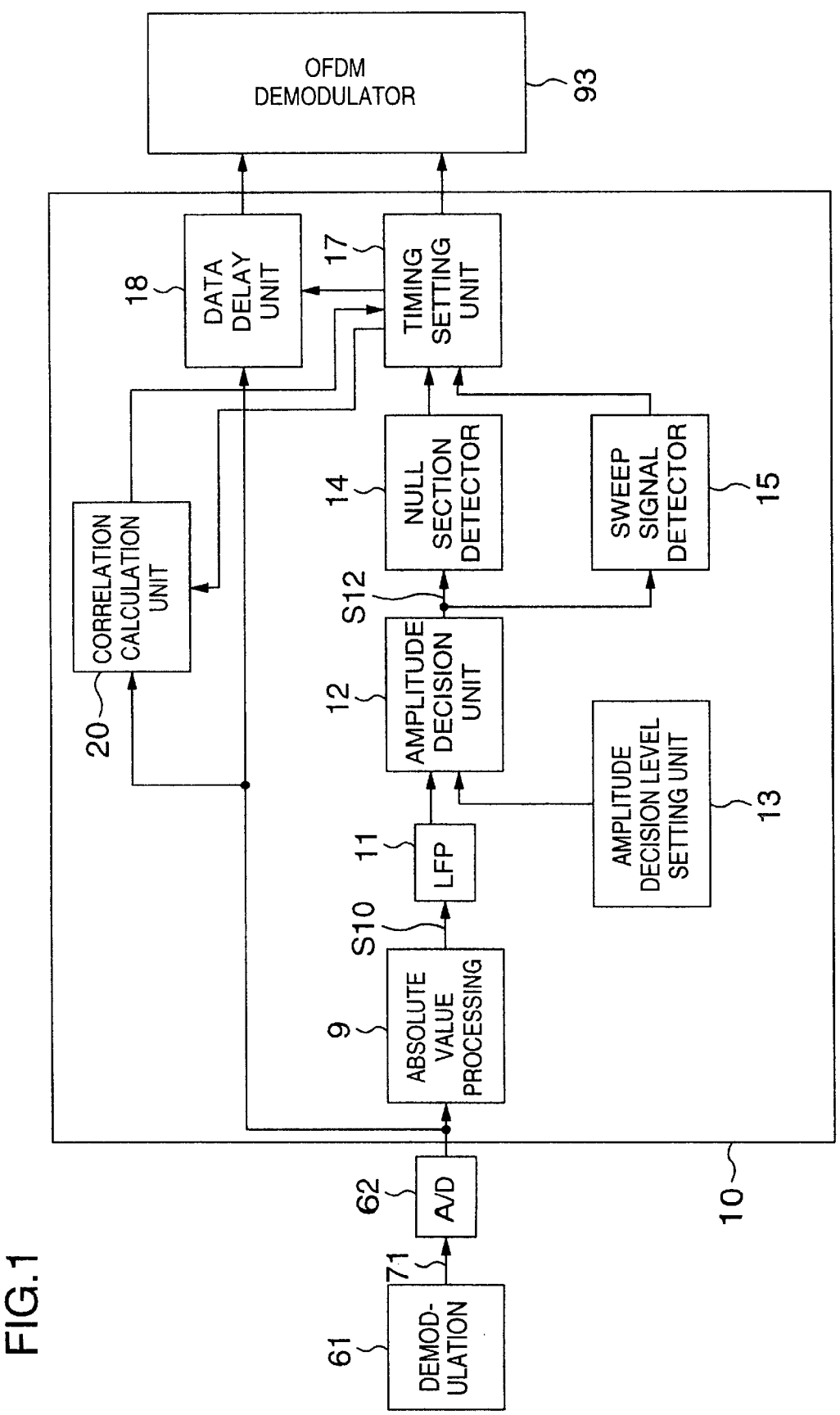
FIG. 1 is a block diagram schematically illustrating a demodulating unit for receiver of a data transmission apparatus according to an embodiment of the present invention.
Figure 2:
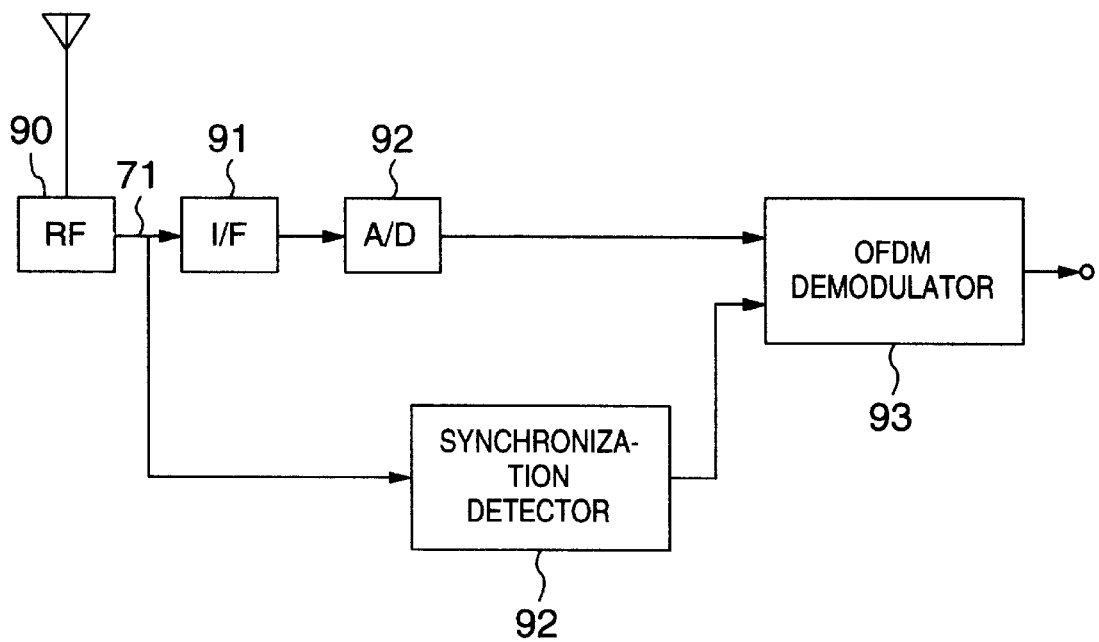
FIG. 2 is a block diagram schematically illustrating a demodulating unit for receiver of a conventional data transmission apparatus.
Figure 3A:
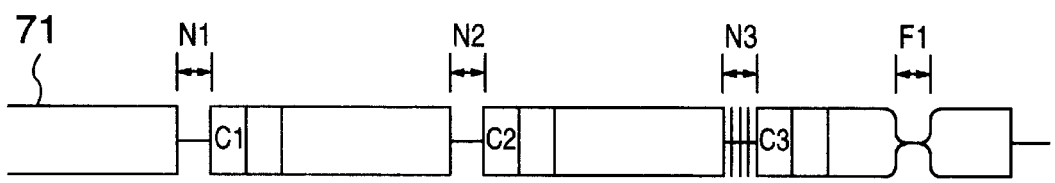
FIGS. 3A and 3B show waveforms of signals at portions of the demodulating unit for receiver of the conventional data transmission apparatus.
Figure 3B:
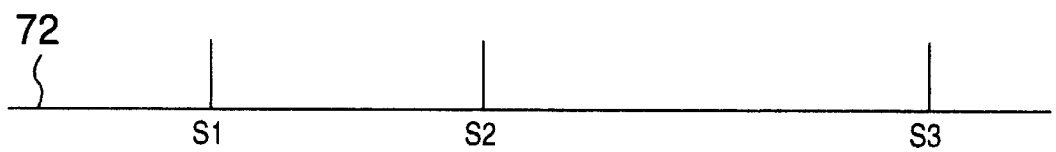

Further, since the signal S10 (the OFDM signal 73 of FIG. 11B) of FIG. 1 is compared with the decision level set previously by the amplitude-of-received signal decision level setting unit 13, predetermined synchronization signals C1, C2 and C3 are inserted after null periods N1, N2 and N3 as shown by the OFDM received signal 71 of FIG. 11A so as to be able to judge the end of null clearly. The synchronization signals C1, C2 and C3 may be the sweep signals with which the amplitude of the OFDM signal is maximized as described above.

Figure 11F:
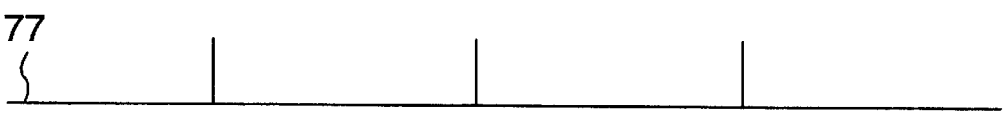

A sweep signal detector 15 shown in FIG. 1 produces a signal for notifying detection of the sweep signal or the end of the null section when the sweep signal detector 15 detects the beginning (edge) of the sweep signals C1, C2 and C3. FIG. 11F shows a waveform 77 of the end signal of the null section.

Figure 20:
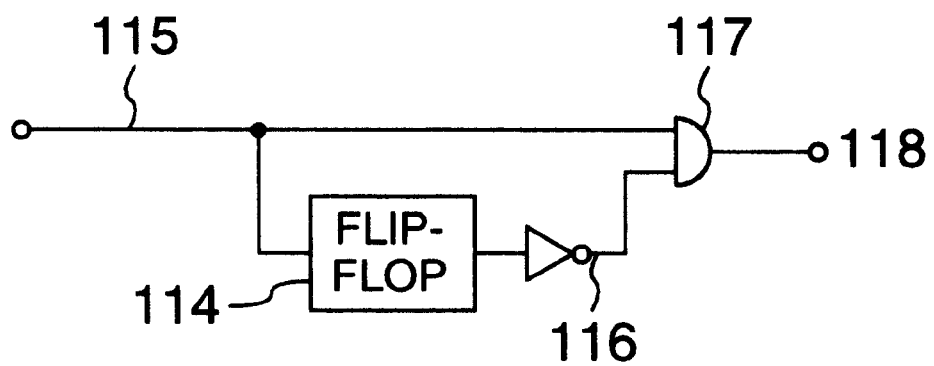
FIG. 20 is a block diagram illustrating a circuit arrangement of a sweep signal detector according to an embodiment of the invention.
Figure 21:
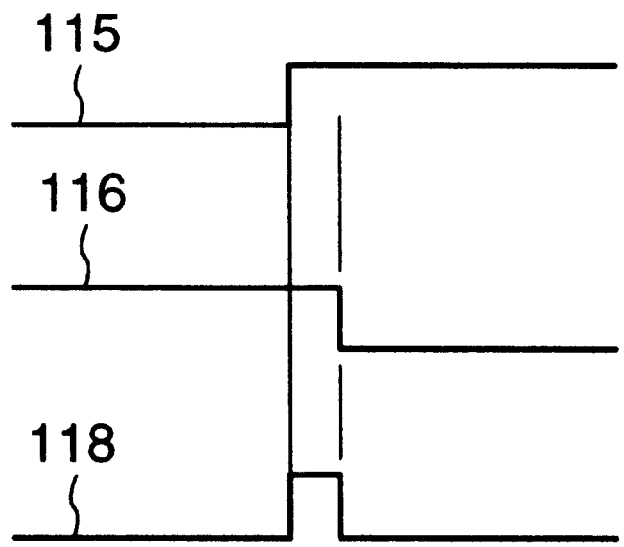
FIG. 21 is a waveform diagram useful for explaining the operation of the circuit of FIG. 20.

An operation of the sweep signal detector 15 will now be described with reference to FIGS. 20 and 21.

The signal S12 in FIG. 1 which corresponds to an input signal 115 is inputted to an AND-gate 117 and is also inputted to a flip-flop 114 where it is delayed by a predetermined time. An output of the flip-flop 114 is inverted to a resultant inverted signal 116 which in turn is inputted to the AND-gate 117 to produce an output 118. More specifically, as shown in FIG. 21, since the inverted signal 116 which is delayed relative to the input signal 115 and inverted is inputted to the AND-gate 117, the output signal 118 of the AND-gate 117 constitutes a pulse that detects the rise of the input signal 115, namely, the sweep signal.

Figure 11G:
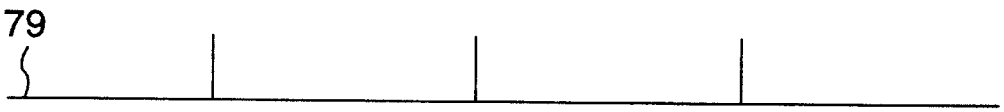

Only when a timing setting unit or timing controller 17 for receiver shown in FIG. 1 receives the null section detection signal 76 of the null section detector 14 and the sweep signal detection signal 77 of the timing setting unit 17 for receiver in a pair, the timing setting unit 17 judges that a correct synchronization signal is received and distributes the synchronization signal shown by 79 of FIG. 11G to each block of receiver 210.

Figure 19:
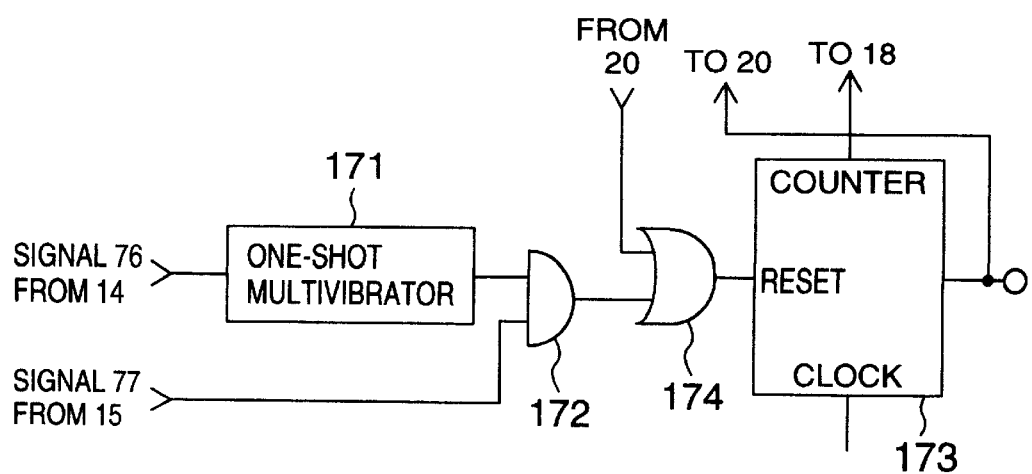
FIG. 19 is a block diagram schematically illustrating a timing setting unit.

FIG. 19 is a block diagram illustrating the timing controller 17. In FIG. 19, numeral 171 denotes a one-shot multivibrator, 172 an AND gate, and 173 a counter which receives an output signal of the AND gate 172 as a reset input. The null section detection signal 76 is applied to one input of the AND gate 172 through the one-shot multivibrator 171 and the sweep signal detection signal 77 is also applied to the other input of the AND gate 172. With this configuration, only when both the signals 76 and 77 are detected in a pair, the counter 173 outputs the synchronization signal.

In order to synchronize the receiver with the transmitter, the clock generator in the receiver is controlled so that the frequency and the phase of the clock of the receiver follow the frequency and the phase of the clock of the transmitter. In this control, correlation calculation of the sweep signal received by the receiver and the sweep signal provided in the receiver is made to calculate a frequency difference and a phase difference of the clocks of the receiver and the transmitter, so that the clock generator in the receiver is controlled by the calculated differences.

This control will be explained in detail with reference to FIG. 22.

The baseband OFDM signal from the RF/IF demodulator 61 after demodulation thereat is inputted to the A/D converter 62 whose output in turn is inputted to the OFDM demodulator 93. On the other hand, the baseband OFDM signal outputted from the A/D converter 62 is also inputted to a sync signal detector 125 where a rough sync position is detected from the received signal and is inputted to the sweep signal correlation calculation unit 127. The sweep signal correlation calculation unit 127 receives sweep symbol data outputted from a sync symbol memory 126 and calculates correlation between the sync symbol data of the received signal and the sweep symbol data from the sync signal memory 126. An oscillation frequency control signal generator 128 controls a local oscillator 130 in accordance with the output of the sweep signal correlation calculation unit 127 such that when the point of a sample where a peak correlation value is obtained is leading relative to a reference phase which the receiver has, the local oscillator 130 is controlled so as to decrease the oscillation frequency, while when the point of a sample where a peak correlation value is obtained is lagging relative to the reference phase of the receiver, it is controlled to increase the oscillation frequency. Based on a clock signal generated from the local oscillator 130, a timing generator 131 generates a signal (not shown) and delivers it to respective blocks in FIG. 22, the signal being generated every frame so as to be used as a reference for the operation timing of the demodulator. The output of the local oscillator 130 is also used as a sampling clock of the A/D converter 62.

Note, in the above processing, that there occurs a delay until the detected result of synchronization is produced after the output of the A/D converter 62 has been inputted to the controller 10 for demodulator due to processing of the digital signal. Accordingly, a data delay unit 18 delays the OFDM digital signal inputted to the controller 10 for demodulator in accordance with the timing controller 17 for receiver to match the output of the timing controller 17 for receiver to the phase. Outputs of the data delay unit 18 and the timing controller 17 are fed to the OFDM demodulator 93 to demodulate the OFDM digital signal.

In the processing that the sweep signal subsequent to the null section is detected to take synchronization, there is a case where the position of the start point of the sweep signal is judged in error due to noise mixed in the null section and the sweep signal subsequent to the null section when the start point of the sweep signal is to be detected. An example thereof is shown in FIGS. 4A and 4B.

Figure 4A:
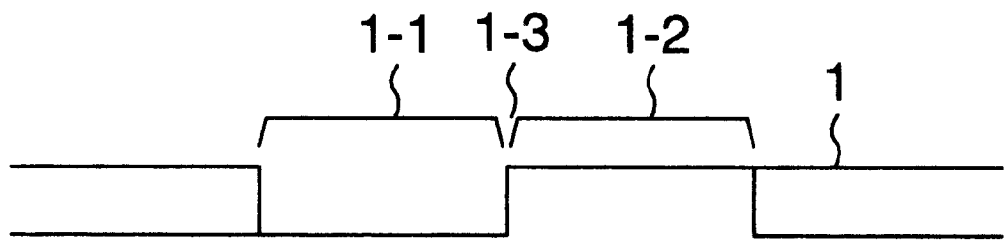
FIGS. 4A and 4B show waveforms illustrating timing of a synchronization symbol portion.
Figure 4B:
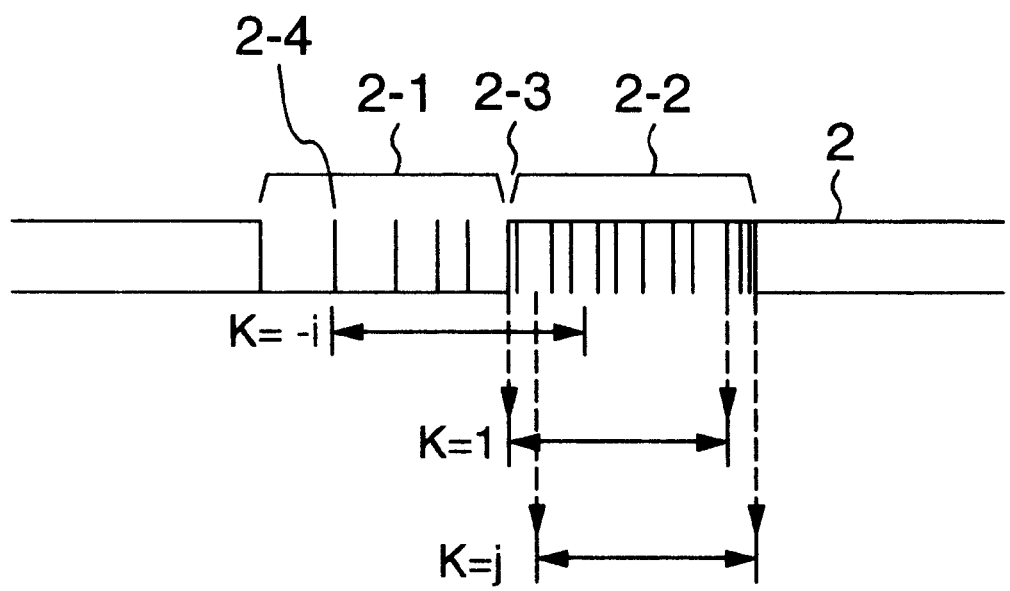

Binarized synchronization symbol waveforms 1 and 2 shown in FIGS. 4A and 4B are enlarged waveforms of a section of the synchronization symbol 78 which is the synchronization symbol portion of the decision result 74 of FIG. 11C.

In this connection, when the section of the synchronization symbol 78 of FIG. 11C includes the noiseless null section 1-1 and the noiseless sweep signal 1-2 as shown by the binarized synchronization symbol waveform 1 of FIG. 4A, the start point 1-3 of the sweep signal can be judged clearly, while when noise is mixed in the section of the synchronization symbol 78 of FIG. 11C as shown by the null section 2-1 and the sweep signal 2-2 of the binarized synchronization symbol waveform 2 of FIG. 4B, the noise 2-4 mixed in the null section 2-1 is wrongly judged as the position of the start point of the sweep signal by the simple detection of the rising of the signal.

As a countermeasure thereof, it is necessary to widen the range of the correlation calculation of the sweep signal and detect the exact position of the start point 2-3 of the sweep signal. This correlation calculation of the sweep signal is performed by a correlation calculation unit 20 of FIG. 1.

Figure 18:
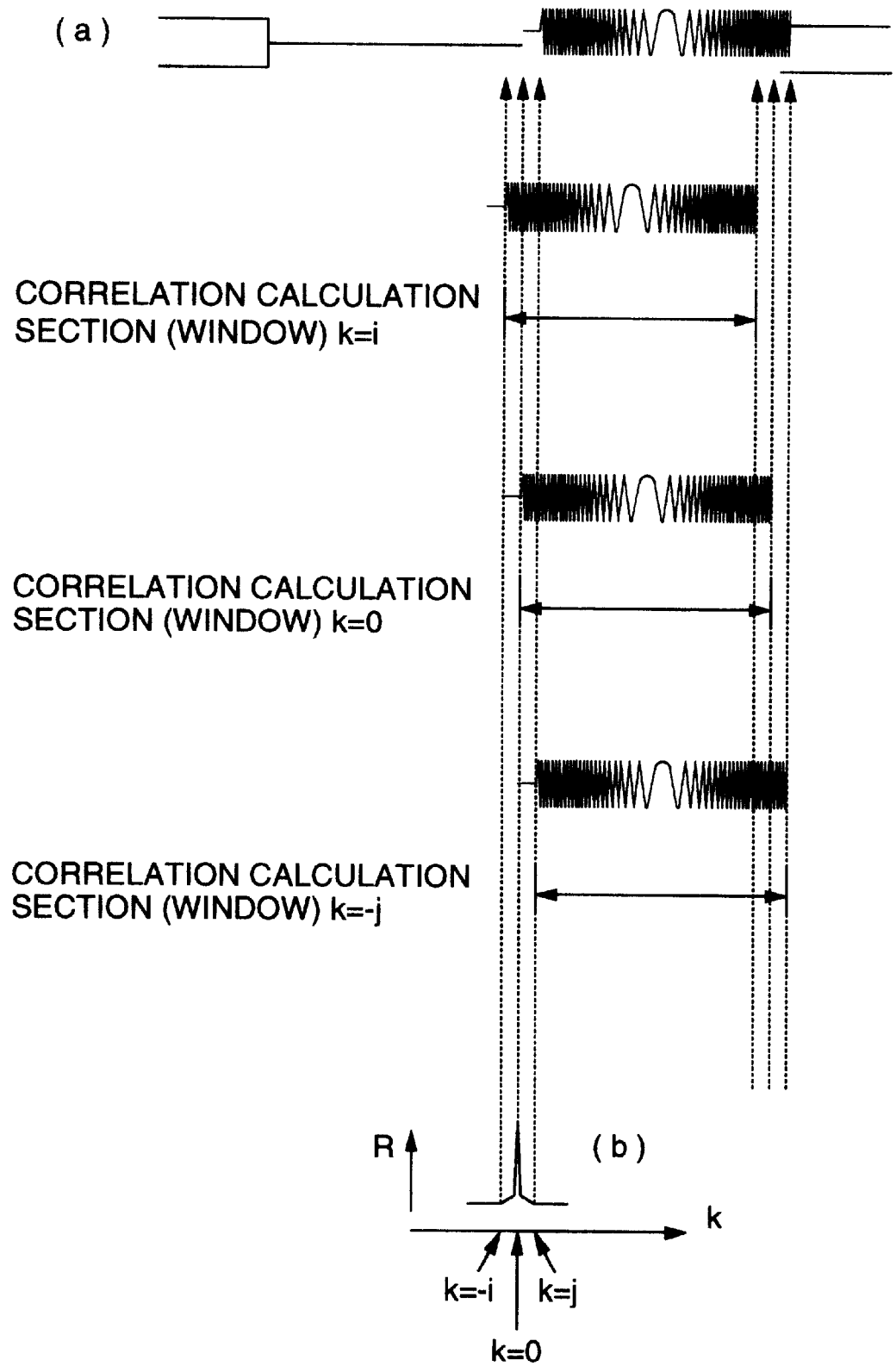
FIG. 18 is a diagram useful to explain operation that correlation of a reference signal contained in a receiver and a received signal is calculated to reproduce synchronization exactly.

Referring now to FIG. 18, the method of synchronizing the receiver with the transmitter exactly on the basis of data (symbols 161 and 162 indicating a specific time on the time axis are inserted in addition to the null symbol as shown by the data string shown in FIG. 16) transmitted by the transmitter is described.

An example in which the sweep symbol subsequent to the null symbol as shown in FIG. 18(a) is inserted is now described. The correlation calculation unit 20 in the receiver performs the correlation calculation of a reference signal not shown and provided in the receiver and the received signal as shown in FIG. 18(a). The correlation calculation is performed by shifting sample points for starting the correlation calculation in order as shown in FIG. 18. For example, when the start point of the correlation calculation is shifted in order from k=−i to k=j, the correlation calculation results are plotted as shown in FIG. 18(b). The abscissa axis k represents a sample point and the ordinate axis R represents a correlation value. In this example, since there is a sharp peak (maximum value) at k=0, the synchronization can be reproduced exactly in the receiver upon k=0. An output signal of the correlation calculation unit 20 is supplied through an OR gate 174 to the counter 173 in the timing controller 17 to reset the counter 173 to correct the shift of the start point.

Figure 5A:
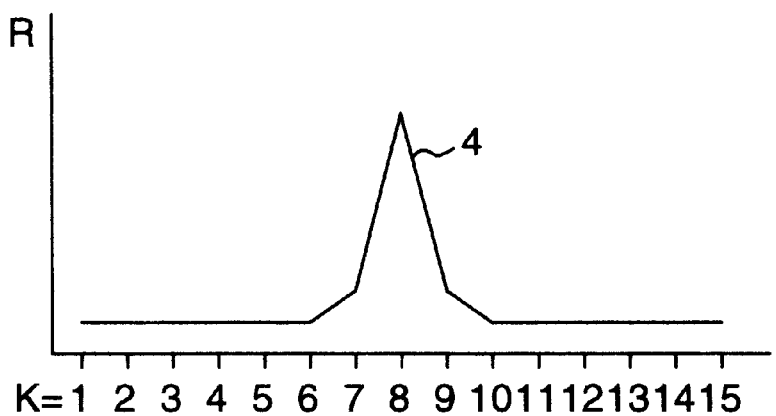
FIGS. 5A and 5B illustrate calculated results of correlation of a sweep signal.

Returning to the description of the detection of the start point of the sweep signal, in the case of the noiseless binarized synchronization symbol waveform 1 shown in FIG. 4A, since the start point 1-3 of the sweep signal can be detected exactly, the correlation calculation of the sweep signal is performed by j times from K=1 to K=j (j is an integer larger than or equal to 2) by using the start point 1-3 of the sweep signal as the start point of the correlation calculation. An example of a correlation value R thereof is shown by a correlation calculation result 4 of FIG. 5A.

Figure 5B:
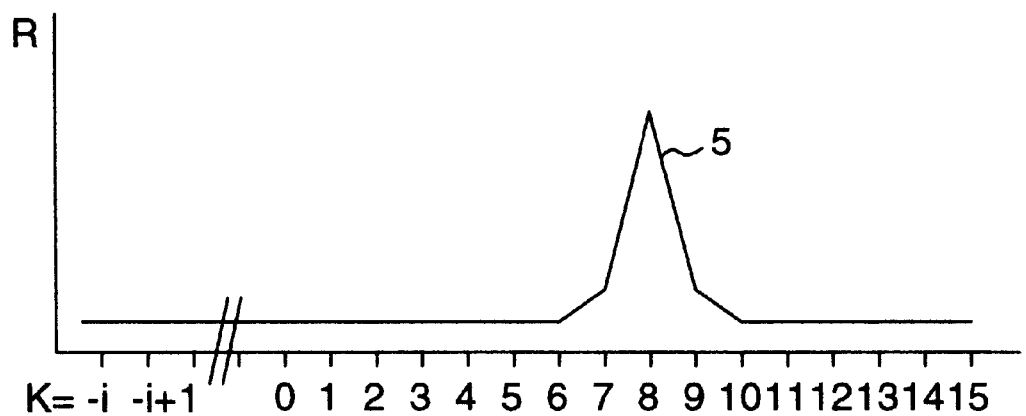

On the other hand, in the case of the binarized synchronization symbol waveform 2 in which noise is mixed as shown in FIG. 4B, since the position of noise 2-4 is wrongly judged as the position of the start point of the sweep signal when the start point 2-3 of the sweep signal is detected, it is necessary to perform the correlation calculation of the sweep signal by i+j times from K=−i (i is an integer larger than or equal to 2) to K=j. An example of a correlation value R thereof is shown by a correlation calculation result 5 of FIG. 5B.

In conclusion, when the C/N ratio of the received signal is low and noise is mixed in the null section and the sweep signal subsequent to the null section, so that the exact start point of the sweep signal cannot be detected, it is necessary that the correlation calculation of the sweep signal of a wide section in which the number of samples larger than or equal to the number of samples between the exact start point of the sweep signal and the point judged in error as the start point of the sweep signal is added is performed to detect the synchronization point, resulting in an enlargement of the scale of the correlation calculation processing of the sweep signal.

In view of such, in another embodiment of the present invention, a majority decision type edge detector 19 is added to the configuration of FIG. 1 in place of the sweep signal detector 15, so that the detection accuracy of the start point of the sweep signal subsequent to the null section is further improved.

Figure 6:
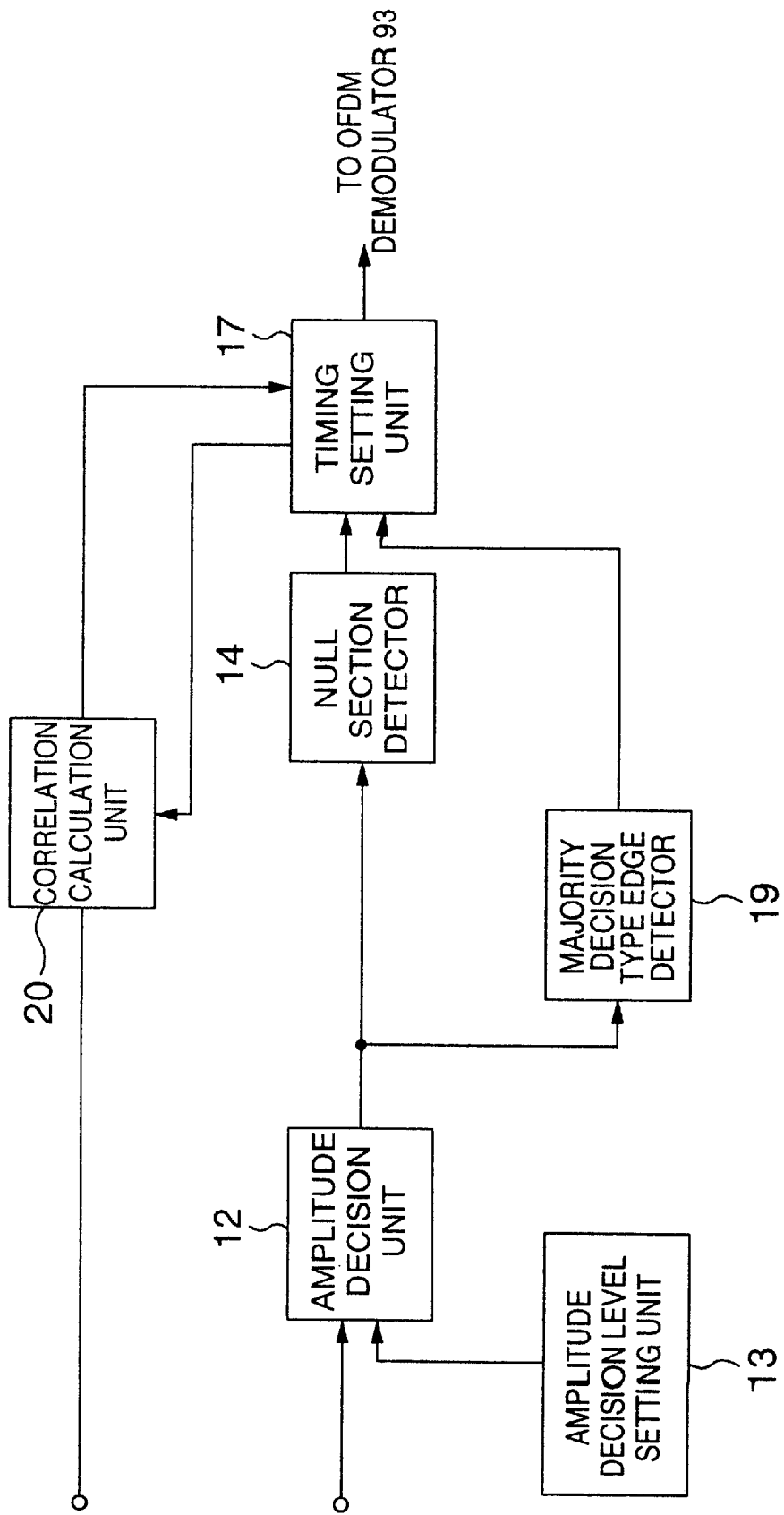
FIG. 6 is a block diagram schematically illustrating an embodiment of a demodulator control unit for receiver of a data transmission apparatus according to the present invention.

A configuration of a controller for demodulator of this embodiment is illustrated in FIG. 6 and operation of the majority decision type edge detector 19 is described. The baseband OFDM signal which has been transmitted by the OFDM transmitter and demodulated to be A/D converted as described above is inputted to the amplitude-of-received signal decision unit 12.

The OFDM baseband signal inputted to the amplitude decision unit 12 is compared with the decision level set in the amplitude-of-received signal decision level setting unit 13 and the result signal of the comparison is supplied to the null section detector 14 and the majority decision type edge detector 19. The null section detector 14 detects the null section and the majority decision type edge detector 19 detects the start of the sweep signal.

An output signal of the majority decision type edge detector 19 is supplied to the sweep signal detector 15 to detect the starting edge of the sweep signal.

When both of the null section detection signal of the null section detector 14 and the sweep signal detection signal of the sweep signal detector 15 are supplied to the timing controller 17 for receiver, the timing controller 17 judges that the exact synchronization is detected and distributes the synchronization signal to each block of the receiver 210 shown in FIG. 10.

An embodiment of the majority decision type edge detector 19 of the present invention is now described with reference to FIG. 7. The binarized signal compared in the amplitude-of-received signal decision unit 12 with the decision level set by the amplitude-of-received signal decision level setting unit 13 is supplied to the majority decision type edge detector 19.

This signal is supplied to a shift register 21-1 and is shifted therefrom to shift registers 21-2, . . . , 21-n (n is an integer larger than or equal to 2) successively. Output signals from the shift registers 21-1 to 21-n are supplied to an adder 22.

In short, an output of the adder 22 is equal to the number of samples at the time when the signals inputted to the shift registers 21-1 to 21-n are larger than the decision level set in the amplitude-of-received signal decision level setting unit 13.

The output of the adder 22 is compared with a set value of a sweep signal decision level setting unit 23 by the comparator 24. For example, when it is assumed that there are 20 shift registers 21 and that the set value of the sweep signal decision level setting unit 23 is larger than or equal to 15 samples, when, of samples values of 20 samples, sample values of 15 samples or more, are larger than the decision level set in the amplitude-of-received signal decision level setting unit 13, it is judged that there is a start point of the sweep signal.

As has been described above, since the binarized signal compared in the amplitude-of-received signal decision unit 12 with the decision level set in the amplitude-of-received signal decision level setting unit 13 is edge-detected by the majority decision type edge detector 19, influence of noise mixed in the null section of the received signal and the sweep signal subsequent to the null section is reduced as compared with the configuration of FIG. 1.

Figure 7:
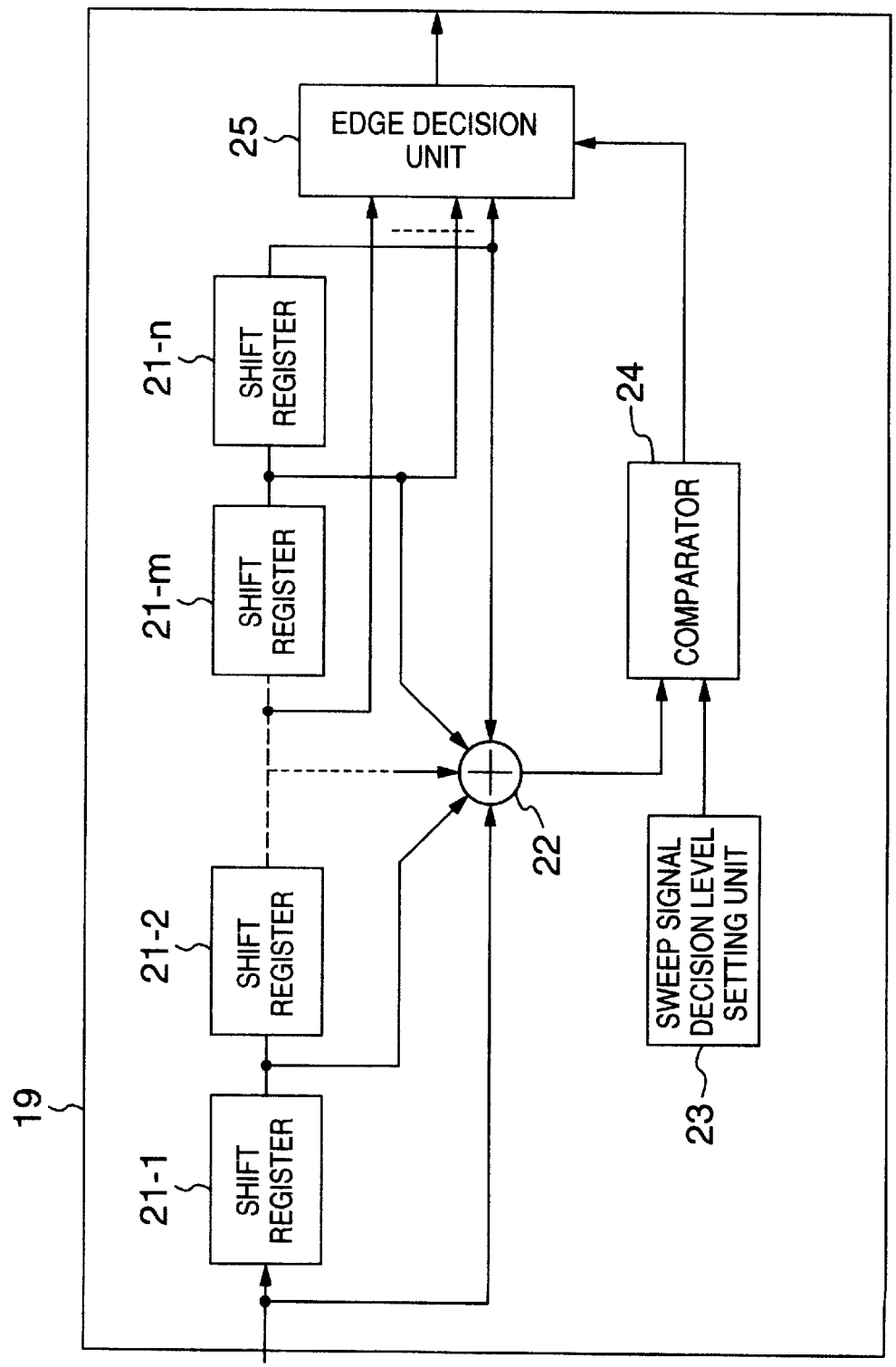
FIG. 7 a block diagram schematically illustrating a majority decision type edge detector of the present invention.

Further, for example, when the sweep signal decision level setting unit 23 of FIG. 7 is set as "when, of sample values of 20 samples, the levels of 15 samples or more of the received signals are larger than the decision level set in the amplitude-of-received signal decision level setting unit 13", the start point of the sweep signal is actually detected within the range from 15 samples to 20 samples of sample values from among the 20 samples and accordingly the detection timing of the start point of the sweep signal is shifted within the range of maximum 5 samples depending upon the quantity of mixed noise.

Since the shift of 5 samples is a shift of the detection position of the start point of the sweep signal, the correlation calculation of the sweep signal shown in FIG. 5 is required to be performed within a wide range containing the shift of 5 clocks as described above.

Figure 8:
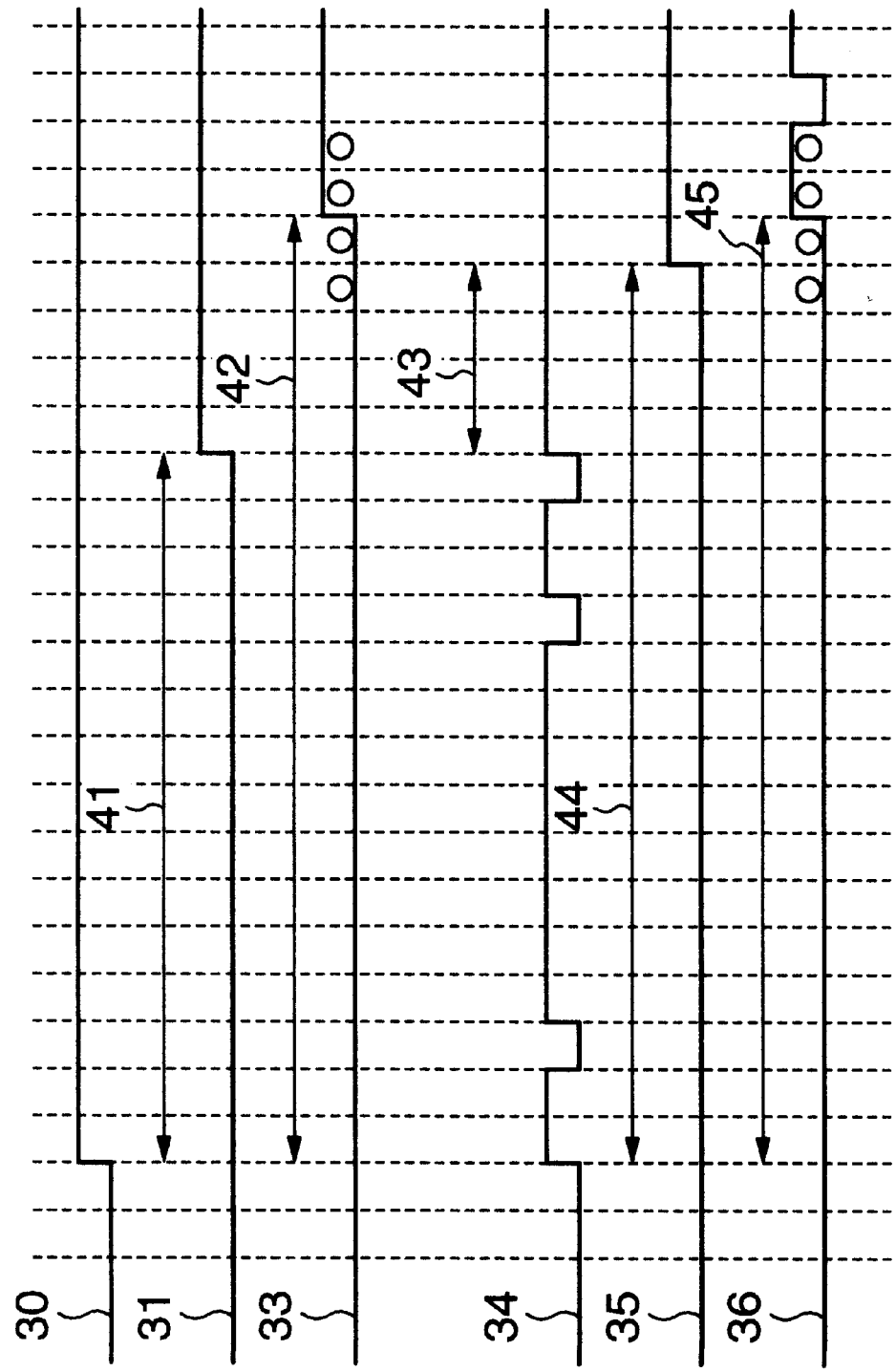
FIG. 8 shows waveforms of signals at the majority decision type edge detector of the present invention.

This point is now described with reference to FIG. 8 showing a concrete operation timing within the majority decision type edge detector 19.

When 20 shift registers 21 are provided in the FIG. 7 arrangement and the noiseless sweep signal as shown by an input waveform 30 of FIG. 8 is supplied to the shift registers 21, the comparator 24 judges whether the output value of the adder 22 is larger than or equal to 15 set in the sweep signal decision level setting unit 23 or not and produces an output waveform 31. A delay period 41 at this time is 15 samples. Further, the output of the shift register 21-n is an output waveform 33.

On the other hand, when a signal mixed with noise of four samples as shown by an input waveform 34 of FIG. 8 is supplied to the shift registers 21, the comparator 24 produces an output waveform 35 and a delay period 44 is 19 samples.

As has been described above, the output timing of the comparator 24 is varied in accordance with the quantity of noise and accordingly when the output of the adder 22 is judged as the start point of the sweep signal on the basis of this condition as it is, four-sample error occurs as shown by detection error 43.

Accordingly, an edge decision unit 25 of FIG. 7 examines the output of the comparator 24 and the state of the shift register 21-n (four samples in this example) and makes decision at the timing when the levels thereof are L, L, H and H, for example.

More particularly, the states of the samples marked with a circle as shown by the output waveform 33 or 36 of FIG. 8 are judged.

Consequently, even if noise is mixed in the null section of the received signal and the sweep signal subsequent to the null section, the start point of the sweep signal can be detected exactly and accordingly the range of correlation calculation can be narrowed.

Figure 9:
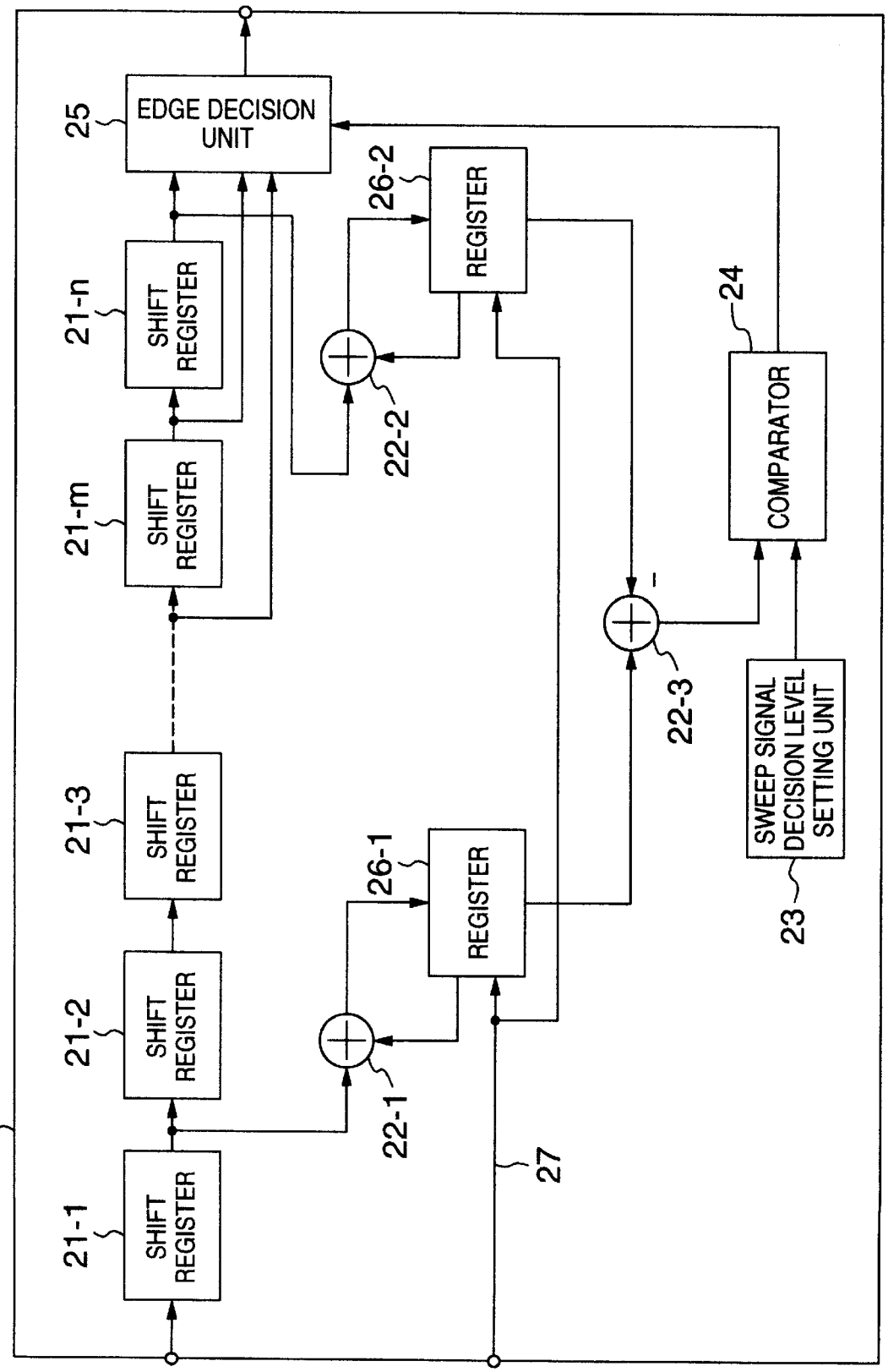
FIG. 9 is a block diagram schematically illustrating another majority decision type edge detector of the present invention.

Another embodiment of the majority decision type edge detector of the present invention is now described with reference to FIG. 9.

The signal compared in the amplitude-of-received signal decision unit 12 of FIG. 1 with the decision level set by the amplitude-of-received signal decision level setting unit 13 and binarized is supplied to the majority decision type edge detector 19.

This signal is supplied to the shift register 21-1 and is shifted therefrom to the shift registers 21-2, . . . , 21-n successively. An adder 22-1 adds inputted binarized decision values and the addition result thereof is stored in a register 26-1.

On the other hand, the outputs of the shift register 21-n are added in an adder 22-2 and the addition result thereof is stored in a register 26-2.

An adder 22-3 subtracts an output of the register 26-2 from an output of the register 26-1 so that the number of those samples produced between from the shift registers 21-1 to 21-n that are larger than or equal to the decision level set by the amplitude-of-received signal decision level setting unit 23 is obtained.

The comparator 24 compares this value with the number of samples set by the sweep signal decision level setting unit 23 and decides that there is a sweep signal when the value is larger than or equal to the number of samples set by the sweep signal decision level setting unit 23. However, since the output of the comparator 24 is shifted in the detection timing in accordance with the quantity of mixed noise as shown by the output waveforms 33 and 36 of FIG. 8 in the same manner as the comparator 24 of the majority decision type edge detector 19 of FIG. 7, the output of the comparator 24 and the state of the shift register 21-n (four samples in this example) are examined and decision is made at the timing that the levels thereof are L, L, H and H, for example in the same manner as the edge detector 25 of FIG. 7.

In the case of the majority decision type edge detector 19, since the registers 26-1 and 26-2 have addition loops, initialization thereof is required. The initialization is made by a reset signal 27. Further, it is necessary that the number of bits of the registers 26-1 and 26-2 can express the number larger than or equal to the number of total stages of the shift registers 21-1 to 21-n.

In the above example, while the sweep signal subsequent to the null section is used as the synchronization symbol group, any signals having a fixed amplitude, such as a signal containing only one carrier signal having a fixed level or the like may be used as the signal subsequent to the null section.

In the present invention, even when the detection of the null section fails due to noise mixed in the null section or when the multipath or fading occurs to reduce the level of the received signal, the probability of mistaking the start point of the sweep signal as a null section is reduced and since the detection processing of the null section is digitized, there can be provided a stable OFDM transmission apparatus capable of exactly detecting the start point of the sweep signal.

What is claimed is:

1. A receiving apparatus of a data transmission signal modulated in accordance with an orthogonal frequency division multiplex modulation (OFDM) system wherein data is transmitted using a plurality of carriers which are in a mutually orthogonal relationship with one another, comprising:

a demodulation unit for demodulating said OFDM modulated data transmission signal received, to a baseband OFDM signal, said OFDM modulated data transmission signal including a group of predetermined synchronization symbols inserted therein every fixed period, said group of predetermined synchronization symbols including a no signal period and another synchronization symbol subsequent thereto;

an analog-to-digital converter supplied with said baseband OFDM signal;

a controller; and a demodulator connected to said controller;

wherein said controller comprises:

means for obtaining an absolute value signal having as an amplitude value an absolute value of a digital signal produced from said analog-to-digital converter, a decision unit for deciding whether said amplitude value of said absolute value signal is larger than or equal to a predetermined amplitude value or not, means for detecting said no signal period in said OFDM modulated data transmission signal from an output of said decision unit means for detecting a start point of said another synchronization symbol subsequent to said no signal period from the output of said decision unit, and means for producing a signal representative of a synchronization timing on the basis of detection of both of the presence of said no signal period and said start point of said another synchronization symbol subsequent to said no signal period to supply said signal to said demodulator whereby said demodulator is operated in synchronism with said synchronization timing.

2. A receiving apparatus according to claim 1, wherein said decision unit includes a comparator supplied with said absolute value signal and said predetermined amplitude value and a counter for increasing or decreasing a count thereof in accordance with a comparison result of said comparator, whereby said decision unit detects a point in time when said count is larger than a predetermined value as said start point of said no signal period.

3. A receiving apparatus according to claim 1, wherein said controller includes a filter connected between said means for obtaining said absolute signal and said decision unit for limiting a bandwidth of said absolute signal.

4. A receiving apparatus according to claim 1, wherein said means for detecting said start point of said another synchronization symbol includes majority decision type edge detection means for deciding said start point from signal states of N samples (N is an integer larger than or equal to 2) of the output of said decision unit.

5. A receiving apparatus according to claim 4, wherein said majority decision type edge detection means includes means for counting a number of times a signal of said another synchronization symbol subsequent to said no signal period exceeds said predetermined amplitude value during a period of said N samples and detecting a position of said start point of said another synchronization symbol from said count and means for judging whether an arrangement pattern of signal values of said another synchronization symbol during the period of said N samples is a predetermined pattern or not to detect said start point of said another synchronization symbol.

6. A receiving apparatus according to claim 4, wherein said another synchronization symbol is a sweep signal and said controller further includes means responsive to detection of both of the presence of said no signal period and said start point of said sweep signal for calculating correlation of said digitized sweep signal from said analog-to-digital converter and a reference sweep signal, said means for producing said signal representative of said synchronization timing and supplying said signal to said demodulator being responsive to said means for calculating said correlation to produce an exact synchronization timing.

7. A receiving apparatus according to claim 3, wherein said means for detecting said start point of said another synchronization symbol includes majority decision type edge detection means for deciding said start point from signal states of N samples (N is an integer larger than or equal to 2) of the output of said decision unit.

8. A receiving apparatus according to claim 7, wherein said majority decision type edge detection means includes means for counting a number of times a signal of said another synchronization symbol subsequent to said no signal period exceeds said predetermined amplitude value during a period of said N samples and detecting a position of said start point of said another synchronization symbol from said count and means for judging whether an arrangement pattern of signal values of said another synchronization symbol during the period of said N samples is a predetermined pattern or not to detect said start point of said another synchronization symbol.

9. A receiving apparatus according to claim 8, wherein said another synchronization symbol is a sweep signal and said controller further includes means responsive to detection of both of the presence of said silent signal period and said start point of said sweep signal for calculating correlation of said digitized sweep signal from said analog-to-digital converter and a reference sweep signal, said means for producing said signal representative of said synchronization timing and supplying said signal to said demodulator being responsive to said means for calculating said correlation to produce an exact synchronization timing.

10. A transmission apparatus using an orthogonal frequency division multiplex modulation (OFDM) system wherein data is transmitted using a plurality of carriers which are in a mutually orthogonal relationship with one another, comprising:
a transmitter for producing an OFDM modulated transmission signal in which a group of predetermined synchronization symbols are inserted every predetermined period, said group of predetermined synchronization symbols including a no signal period and another synchronization symbol subsequent thereto; and
a receiver for receiving said OFDM modulated transmission signal,
wherein said receiver comprises,
a demodulation unit for demodulating said OFDM modulated transmission signal received, to a baseband OFDM signal,
an analog-to-digital converter supplied with said baseband OFDM signal,
a controller, and
a demodulator connected to said controller,
wherein said controller comprises:
means for obtaining an absolute value signal having as an amplitude value an absolute value of a digital signal produced from said analog-to-digital converter,
a decision unit for deciding whether said amplitude value of said absolute value signal is larger than or equal to a predetermined amplitude value or not,
means for detecting said no signal period in said OFDM modulated data transmission signal from an output of said decision unit,
means for detecting a start point of said another synchronization symbol subsequent to said no signal period from the output of said decision unit, and
means for producing a signal representative of a synchronization timing on the basis of both of the presence of said no signal period and said start point of said another synchronization symbol subsequent to said no signal period to supply said signal to said demodulator,
whereby said demodulator is operated in synchronism with said synchronization timing.

11. A transmission apparatus according to claim 10, wherein said decision unit includes a comparator supplied with said absolute value signal and said predetermined amplitude value and a counter for increasing or decreasing a count thereof in accordance with a comparison result of said comparator, whereby said decision unit detects a point in time when said count is larger than a predetermined value as said start point of said no signal period.

12. A transmission apparatus according to claim 10, wherein said controller includes a filter connected between said means for obtaining said absolute signal and said decision unit for limiting a bandwidth of said absolute value signal.

13. A transmission apparatus according to claim 10, wherein said means for detecting said start point of said different synchronization symbol includes majority decision type edge detection means for deciding said start point from signal states of N samples (N is an integer larger than or equal to 2) of the output of said decision unit.

14. A transmission apparatus according to claim 13, wherein said majority decision type edge detection means includes means for counting a number of times a signal of said another synchronization symbol subsequent to said no signal period exceeds said predetermined amplitude value during a period of said N samples and detecting a position of said start point of said another synchronization symbol from said count and means for judging whether an arrangement pattern of signal values of said another synchronization symbol during the period of said N samples is a predetermined pattern or not to detect said start point of said different synchronization symbol.

15. A transmission apparatus according to claim 13, wherein said another synchronization symbol is a sweep signal and said controller further includes means, responsive to detection of both of the presence of said no signal period and said start point of said sweep signal, for calculating correlation of said digitized sweep signal from said analog-to-digital converter and a reference sweep signal, said means for producing said signal representative of said synchronization timing and supplying said signal to said demodulator being responsive to said means for calculating said correlation to produce an exact synchronization timing.

16. A transmission apparatus according to claim 12, wherein said means for detecting said start point of said another synchronization symbol includes majority decision type edge detection means for deciding said start point from signal states of N samples (N is an integer larger than or equal to 2) of the output of said decision unit.

17. A transmission apparatus according to claim 16, wherein said majority decision type edge detection means includes means for counting a number of times a signal of said another synchronization symbol subsequent to said no signal period exceeds said predetermined amplitude value during a period of said N samples and detecting a position of said start point of said another synchronization symbol from said count and means for judging whether an arrangement pattern of signal values of said another synchronization symbol during the period of said N samples is a predetermined pattern or not to detect said start point of said another synchronization symbol.

18. A transmission apparatus according to claim 16, wherein said another synchronization symbol is a sweep signal and said controller further includes means responsive to detection of both of the presence of said no signal period and said start point of said sweep signal for calculating correlation of said digitized sweep signal from said analog-to-digital converter and a reference sweep signal, said means for producing said signal representative of said synchronization timing and supplying said signal to said demodulator being responsive to said means for calculating said correlation to produce an exact synchronization timing.

19. A transmission apparatus according to claim 10, wherein said means for detecting said start point of said another synchronization symbol includes majority decision type edge detection means for deciding said start point from signal states of N samples (N is an integer larger than or equal to 2) of the output of said decision unit.

20. A transmission apparatus according to claim 19, wherein said majority decision type edge detection means includes means for counting a number of times a signal of said another synchronization symbol subsequent to said silent signal period exceeds said predetermined amplitude value during a period of said N samples and detecting a position of said start point of said another synchronization symbol from said count and means for judging whether an arrangement pattern of signal values of said another synchronization symbol during the period of said N samples is a predetermined pattern or not to detect said start point of said another synchronization symbol.

21. A transmission apparatus according to claim 19, wherein said another synchronization symbol is a sweep signal and said controller further includes means responsive to detection of both of the presence of said no signal period and said start point of said sweep signal for calculating correlation of said digitized sweep signal from said analog-to-digital converter and a reference sweep signal, said means for producing said signal representative of said synchronization timing and supplying said signal to said demodulator being responsive to said means for calculating said correlation to produce an exact synchronization timing.

22. A receiving apparatus of a data transmission signal modulated in accordance with an orthogonal frequency division multiplex modulation (OFDM) system wherein data is transmitted using a plurality of carriers which are in a mutually orthogonal relationship with one another, comprising:
a demodulation unit for demodulating said OFDM modulated data transmission signal received, to a baseband OFDM signal, said OFDM modulated data transmission signal including a group of predetermined synchronization symbols inserted therein every fixed period, said group of predetermined synchronization symbols including a no signal period and another synchronization symbol subsequent thereto;
an analog-to-digital converter supplied with said baseband OFDM signal;
a controller; and
a demodulator connected to said controller;
wherein said controller comprises:
an absolute value circuit for obtaining an absolute value signal having as an amplitude value an absolute value of a digital signal produced from said analog-to-digital converter,
a decision unit for deciding whether said amplitude value of said absolute value signal is larger than or equal to a predetermined amplitude value or not,
a null section detector for detecting said no signal period in said OFDM modulated data transmission signal from an output of said decision unit,
a sweep signal detector for detecting a start point of said another synchronization symbol subsequent to said no signal period from the output of said decision unit, and
a time setting circuit for producing a signal representative of a synchronization timing on the basis of detection of both of the presence of said no signal period and said start point of said another synchronization symbol subsequent to said no signal period to supply said signal to said demodulator,
whereby said demodulator is operated in synchronism with said synchronization timing.

23. A receiving apparatus according to claim 22, wherein said decision unit includes a comparator supplied with said absolute value signal and said predetermined amplitude value and a counter for increasing or decreasing a count thereof in accordance with a comparison result of said comparator, whereby said decision unit detects a point in time when said count is larger than a predetermined value as said start point of said no signal period.

24. A receiving apparatus according to claim 22, wherein said controller includes a filter connected between said absolute value circuit and said decision unit for limiting a bandwidth of said absolute signal.

25. A receiving apparatus according to claim 22, wherein said sweep signal detector includes a majority decision type edge detector for deciding said start point from signal states of N samples (N is an integer larger than or equal to 2) of the output of said decision unit.

26. A receiving apparatus according to claim 25, wherein said majority decision type edge detector includes a counter for counting a number of times a signal of said another synchronization symbol subsequent to said no signal period exceeds said predetermined amplitude value during a period of said N samples and detecting a position of said start point of said another synchronization symbol from said count and a judging unit for judging whether an arrangement pattern of signal values of said another synchronization symbol during the period of said N samples is a predetermined pattern or not to detect said start point of said another synchronization symbol.

27. A receiving apparatus according to claim 25, wherein said another synchronization symbol is a sweep signal and said controller further includes a first circuit responsive to detection of both of the presence of said no signal period and said start point of said sweep signal for calculating correlation of said digitized sweep signal from said analog-to-digital converter and a reference sweep signal, said time setting unit being responsive to said circuit to produce an exact synchronization timing.

28. A receiving apparatus according to claim 24, wherein said sweep signal detector includes majority decision type edge detector for deciding said start point from signal states of N samples (N is an integer larger than or equal to 2) of the output of said decision unit.

29. A receiving apparatus according to claim 28, wherein said majority decision type edge detector includes a counter for counting a number of times a signal of said another synchronization symbol subsequent to said no signal period exceeds said predetermined amplitude value during a period of said N samples and detecting a position of said start point of said another synchronization symbol from said count and a judging unit for judging whether an arrangement pattern of signal values of said another synchronization symbol during the period of said N samples is a predetermined pattern or not to detect said start point of said another synchronization symbol.

30. A receiving apparatus according to claim 29, wherein said another synchronization symbol is a sweep signal and said controller further includes a circuit responsive to detection of both of the presence of said silent signal period and said start point of said sweep signal for calculating correlation of said digitized sweep signal from said analog-to-digital converter and a reference sweep signal, said time setting unit for producing said signal representative of said synchronization timing and supplying said signal to said demodulator being responsive to said circuit for calculating said correlation to produce an exact synchronization timing.

31. A transmission apparatus using an orthogonal frequency division multiplex modulation (OFDM) system wherein data is transmitted using a plurality of carriers which are in a mutually orthogonal relationship with one another, comprising:

a transmitter for producing an OFDM modulated transmission signal in which a group of predetermined synchronization symbols are inserted every predetermined period, said group of predetermined synchronization symbols including a no signal period and another synchronization symbol subsequent thereto; and a receiver for receiving said OFDM modulated transmission signal, wherein said receiver comprises, a demodulation unit for demodulating said OFDM modulated transmission signal received, to a baseband OFDM signal, an analog-to-digital converter supplied with said baseband OFDM signal, a controller, and a demodulator connected to said controller, said controller including:

an absolute value circuit for obtaining an absolute value signal having as an amplitude value an absolute value of a digital signal produced from said analog-to-digital converter, a decision unit for deciding whether said amplitude value of said absolute value signal is larger than or equal to a predetermined amplitude value or not, a null section detector for detecting said no signal period in said OFDM modulated data transmission signal from an output of said decision unit, a sweep signal detector for detecting a start point of said another synchronization symbol subsequent to said no signal period from the output of said decision unit, and a time setting unit for producing a signal representative of a synchronization timing on the basis of both of the presence of said no signal period and said start point of said another synchronization symbol subsequent to said no signal period to supply said signal to said demodulator, whereby said demodulator is operated in synchronism with said synchronization timing.

32. A transmission apparatus according to claim 31, wherein said decision unit includes a comparator supplied with said absolute value signal and said predetermined amplitude value and a counter for increasing or decreasing a count thereof in accordance with a comparison result of said comparator, whereby said decision unit detects a point in time when said count is larger than a predetermined value as said start point of said no signal period.

33. A transmission apparatus according to claim 31, wherein said controller includes a filter connected between said absolute value circuit and said decision unit for limiting a bandwidth of said absolute value signal.

34. A transmission apparatus according to claim 31, wherein said sweep signal detector includes a majority decision type edge detector for deciding said start point from signal states of N samples (N is an integer larger than or equal to 2) of the output of said decision unit.

35. A transmission apparatus according to claim 34, wherein said majority decision type edge detector includes a counter for counting a number of times a signal of said another synchronization symbol subsequent to said no signal period exceeds said predetermined amplitude value during a period of said N samples and detecting a position of said start point of said another synchronization symbol from said count and a judging unit for judging whether an arrangement pattern of signal values of said another synchronization symbol during the period of said N samples is a predetermined pattern or not to detect said start point of said different synchronization symbol.

36. A transmission apparatus according to claim 34, wherein said another synchronization symbol is a sweep signal and said controller further includes a first circuit, responsive to detection of both of the presence of said no signal period and said start point of said sweep signal, for calculating correlation of said digitized sweep signal from said analog-to-digital converter and a reference sweep signal, said means time setting unit being responsive to said circuit to produce an exact synchronization timing.

37. A transmission apparatus according to claim 33, wherein said sweep signal detector includes a majority decision type edge detector for deciding said start point from signal states of N samples (N is an integer larger than or equal to 2) of the output of said decision unit.

38. A transmission apparatus according to claim 37, wherein said majority decision type edge detector includes a counter for counting a number of times a signal of said another synchronization symbol subsequent to said no signal period exceeds said predetermined amplitude value during a period of said N samples and detecting a position of said start point of said another synchronization symbol from said count and a judging unit for judging whether an arrangement pattern of signal values of said another synchronization symbol during the period of said N samples is a predetermined pattern or not to detect said start point of said another synchronization symbol.

39. A transmission apparatus according to claim 37, wherein said another synchronization symbol is a sweep signal and said controller further includes a circuit responsive to detection of both of the presence of said no signal period and said start point of said sweep signal for calculating correlation of said digitized sweep signal from said analog-to-digital converter and a reference sweep signal, said time setting unit being responsive to said circuit to produce an exact synchronization timing.

40. A transmission apparatus according to claim 31, wherein said sweep signal detector includes a majority decision type edge detector for deciding said start point from signal states of N samples (N is an integer larger than or equal to 2) of the output of said decision unit.

41. A transmission apparatus according to claim 40, wherein said majority decision type edge detector includes a counter for counting a number of times a signal of said another synchronization symbol subsequent to said silent signal period exceeds said predetermined amplitude value during a period of said N samples and detecting a position of said start point of said another synchronization symbol from said count and a judging unit for judging whether an arrangement pattern of signal values of said another synchronization symbol during the period of said N samples is a predetermined pattern or not to detect said start point of said another synchronization symbol.

42. A transmission apparatus according to claim 40, wherein said another synchronization symbol is a sweep signal and said controller further includes a circuit, responsive to detection of both of the presence of said no signal period and said start point of said sweep signal, for calculating correlation of said digitized sweep signal from said analog-to-digital converter and a reference sweep signal, said time setting unit being responsive to said circuit to produce an exact synchronization timing.

* * * * *